(12) United States Patent
Mansour et al.

(10) Patent No.: US 11,830,471 B1
(45) Date of Patent: Nov. 28, 2023

(54) SURFACE AUGMENTED RAY-BASED ACOUSTIC MODELING

(71) Applicant: Amazon Technologies, Inc., Seattle, WA (US)

(72) Inventors: Mohamed Mansour, Cupertino, CA (US); Wontak Kim, Watertown, MA (US); Yuancheng Luo, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 686 days.

(21) Appl. No.: 17/007,681

(22) Filed: Aug. 31, 2020

(51) Int. Cl.
*H04R 3/00* (2006.01)
*G10K 11/36* (2006.01)
*G06T 15/06* (2011.01)

(52) U.S. Cl.
CPC .............. *G10K 11/36* (2013.01); *G06T 15/06* (2013.01); *H04R 3/005* (2013.01); *G10K 2210/505* (2013.01); *H04R 2203/12* (2013.01)

(58) Field of Classification Search
CPC . H04R 3/00; H04R 3/005; H04R 3/04; H04R 3/10; H04R 3/12; H04R 29/00; H04R 29/002; H04R 29/004; H04R 29/005; H04R 29/001; H04R 2203/12; G10L 7/00; G10L 7/302; G10L 7/305; G10L 7/307; G10K 11/16; G10K 2210/505; G06T 15/06
See application file for complete search history.

(56) References Cited

U.S. PATENT DOCUMENTS

| | | | | |
|---|---|---|---|---|
| 9,031,268 B2* | 5/2015 | Fejzo | ........................ | H04S 7/303 |
| | | | | 381/310 |
| 9,602,923 B2* | 3/2017 | Florencio | ................ | G10K 11/16 |
| 10,277,981 B1* | 4/2019 | Frank | ...................... | H04R 27/00 |
| 10,459,684 B2* | 10/2019 | Shih | ......................... | G06F 3/165 |
| 10,582,299 B1* | 3/2020 | Mansour | ............... | H04R 3/005 |
| 10,598,543 B1* | 3/2020 | Mansour | ................ | H04R 1/326 |
| 10,734,965 B1* | 8/2020 | McPherson | ............. | G06F 3/165 |
| 10,750,304 B2* | 8/2020 | McPherson | ............ | H04R 27/00 |
| 10,848,892 B2* | 11/2020 | Sheen | ..................... | G06F 3/165 |
| 11,064,294 B1* | 7/2021 | Masnadi-Shirazi | .... | H04R 1/406 |
| 2008/0285772 A1* | 11/2008 | Haulick | ................. | H04R 1/406 |
| | | | | 381/92 |
| 2015/0334505 A1* | 11/2015 | Crutchfield | ............... | H04S 7/30 |
| | | | | 381/17 |
| 2020/0154229 A1* | 5/2020 | Habets | ................... | H04S 7/304 |

\* cited by examiner

*Primary Examiner* — Thang V Tran
(74) *Attorney, Agent, or Firm* — PIERCE ATWOOD LLP

(57) ABSTRACT

Disclosed are techniques for performing ray-based acoustic modeling that models scattering of acoustic waves by a surface of a device. The acoustic modeling uses two parameters, a room response representing acoustics and geometry of a room and a device response representing acoustics and geometry of the device. The room response is determined using ray-based acoustic modeling, such as ray tracing. The device response can be measured in an actual environment or simulated and represents an acoustic response of the device to individual acoustic plane waves. The device applies a superposition of the room response and the plane wave scattering from the device response to determine acoustic pressure values and generate microphone audio data. The device can estimate room impulse response (RIR) data using data from the microphones, and can use the RIR data to perform audio processing such as sound equalization, acoustic echo cancellation, audio beamforming, and/or the like.

20 Claims, 21 Drawing Sheets

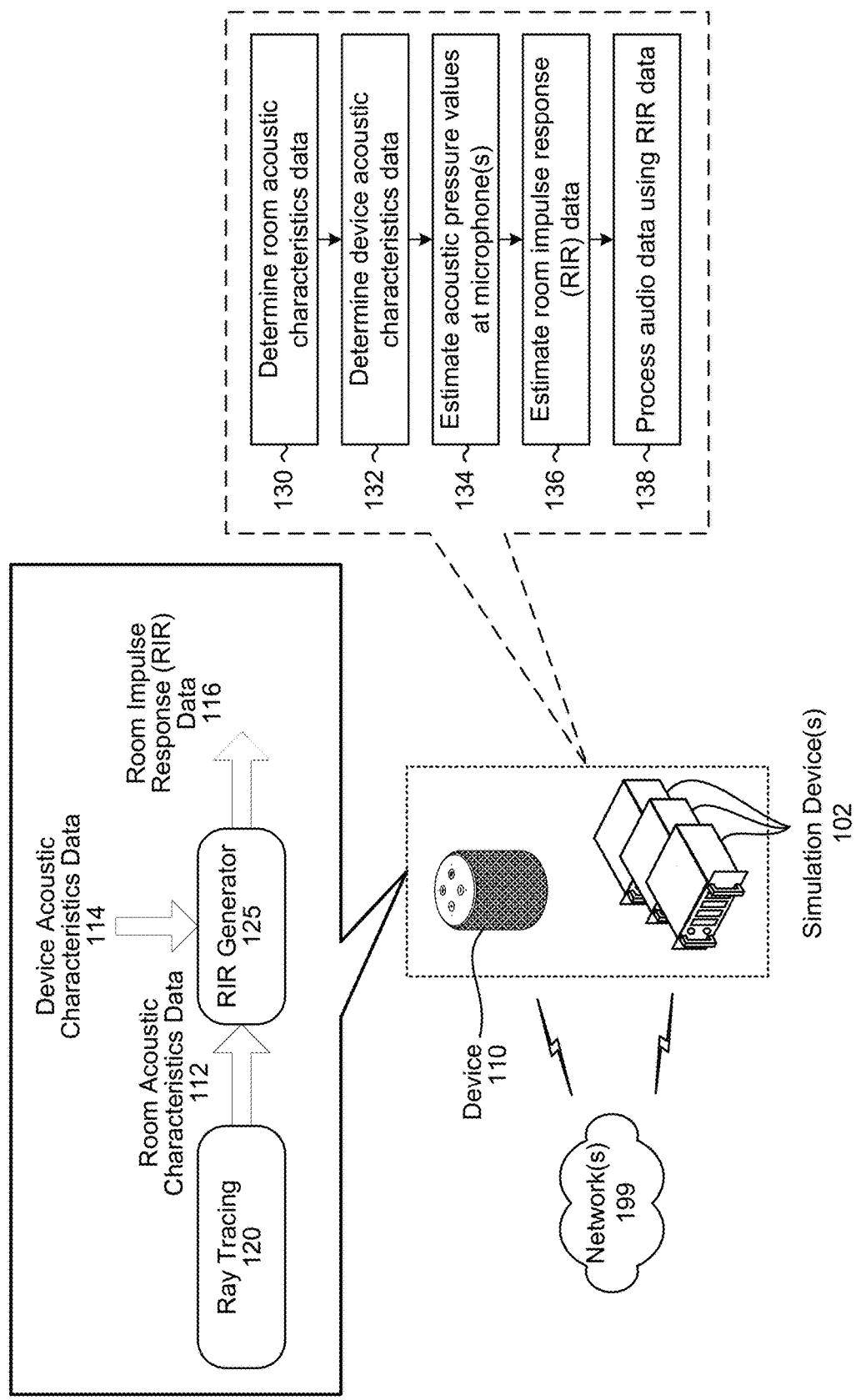

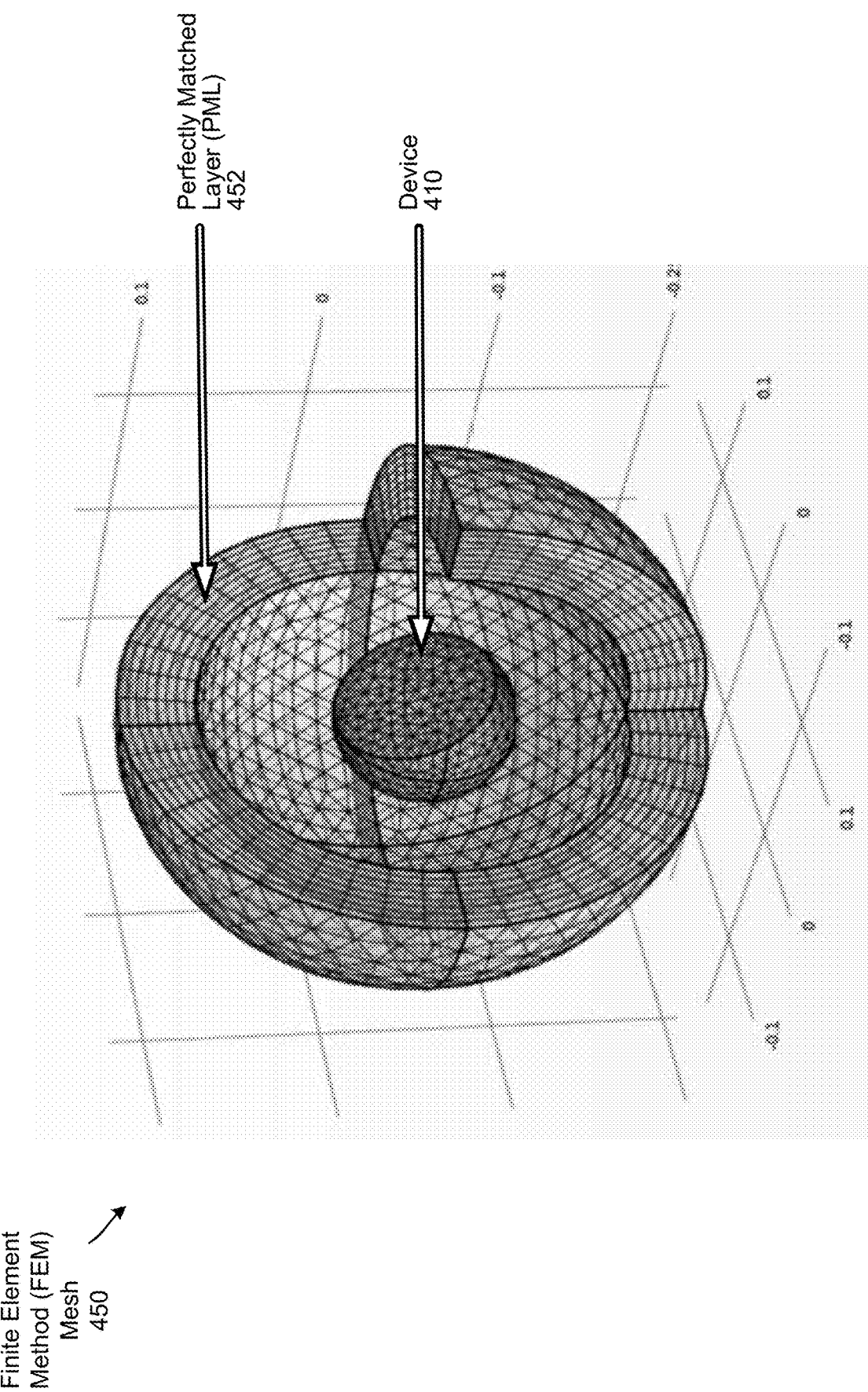

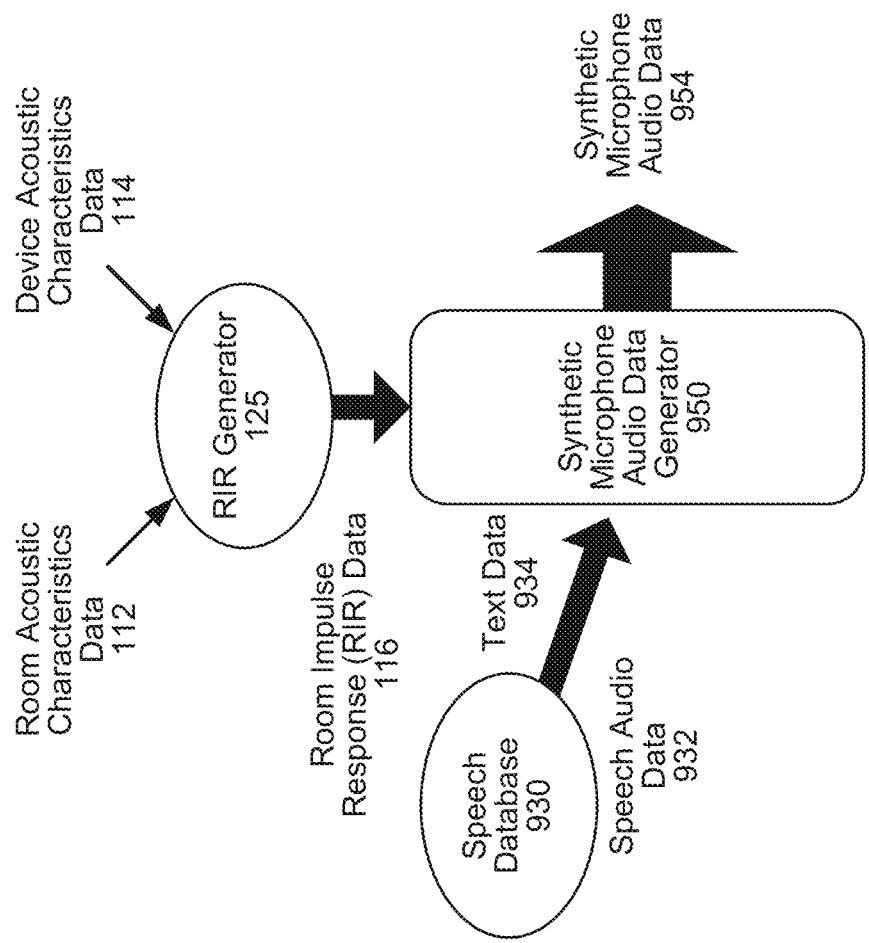

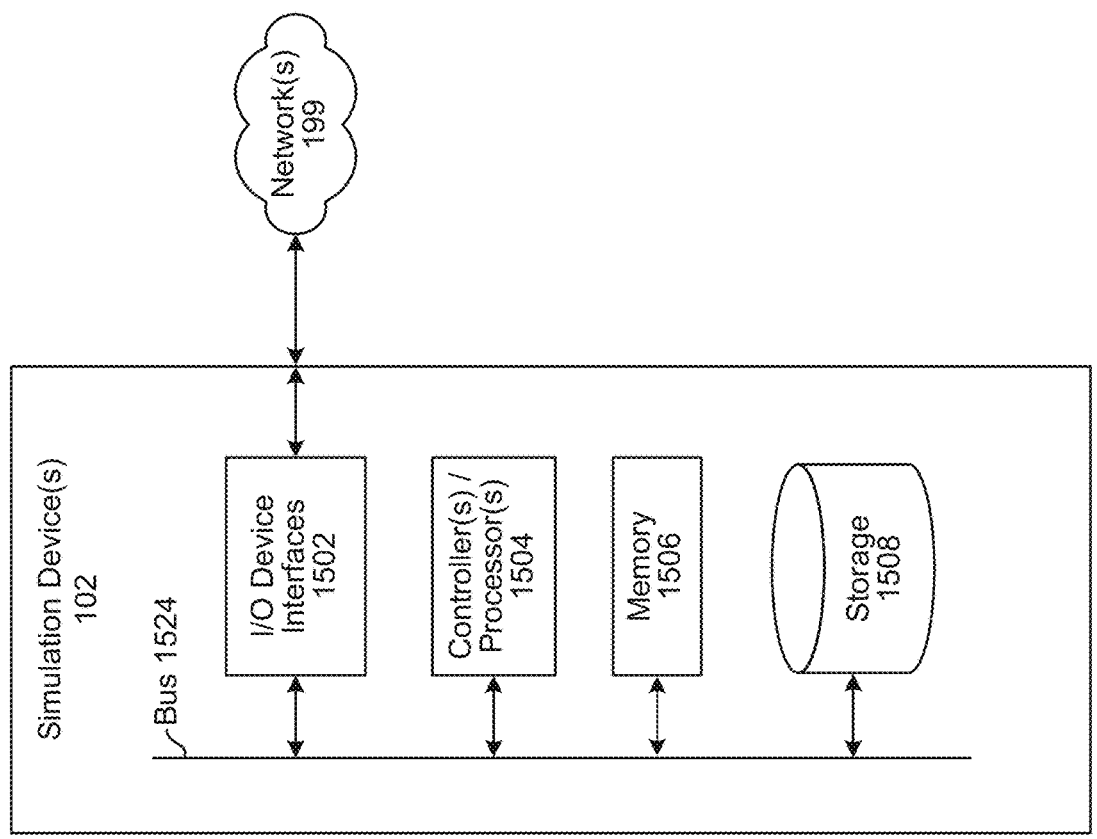

SURFACE AUGMENTED RAY-BASED ACOUSTIC MODELING

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 1 illustrates system configured to perform acoustic modeling according to embodiments of the present disclosure.

FIGS. 4A-4C illustrate a device having a microphone array and examples of determining a device response via simulation or measurement according to embodiments of the present disclosure.

FIGS. 9A-9C illustrate examples of performing simulations of a microphone array according to embodiments of the present disclosure.

FIG. 15 is a block diagram conceptually illustrating example components of a simulation device according to embodiments of the present disclosure.

DETAILED DESCRIPTION

Figure 2B:
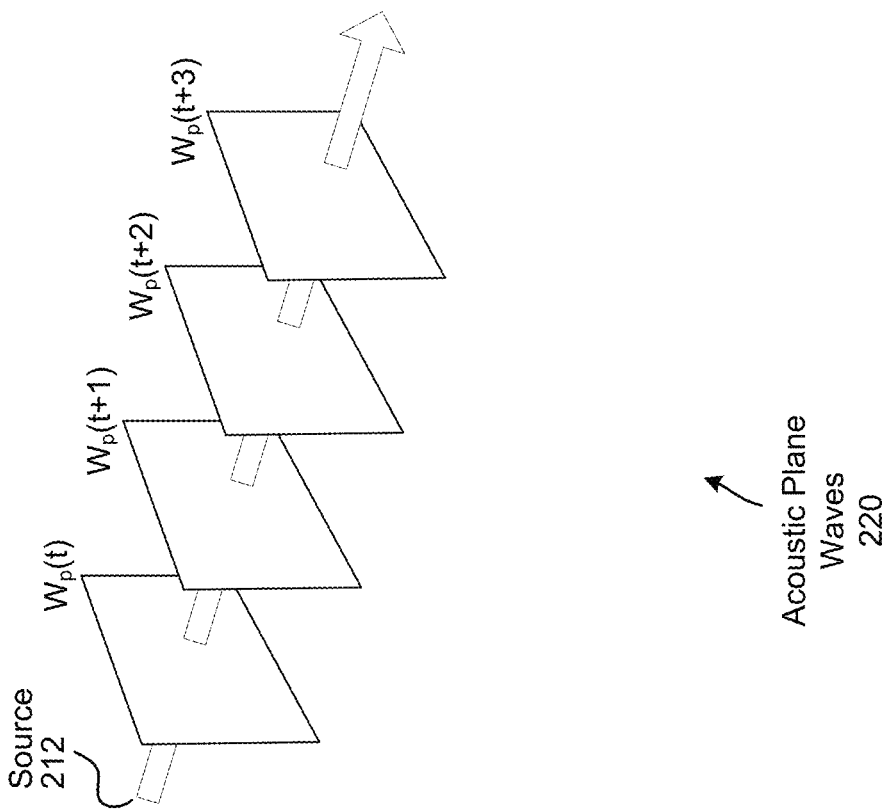
FIGS. 2A-2B illustrate examples of acoustic wave propagation.

Electronic devices may be used to capture audio and process audio data. The audio data may be used for voice commands and/or sent to a remote device as part of a communication session. To process voice commands from a particular user or to send audio data that only corresponds to the particular user, the device may attempt to isolate desired speech associated with the user from undesired speech associated with other users and/or other sources of noise, such as audio generated by loudspeaker(s) or ambient noise in an environment around the device.

The device can perform acoustic modeling to model room acoustics (e.g., impulse response), which can be used to improve input audio data generated by a microphone array of the device and/or output audio generated by the loudspeaker(s) of the device. Ray tracing is a popular low complexity technique for modeling room acoustics, modeling acoustic waves using acoustic rays. However, a geometry of a microphone array of the device may affect the impulse response, and ray tracing is not suited to model microphones that are mounted on a rigid surface as ray tracing does not account for plane wave scattering caused by the surface of the device.

To improve ray-based acoustic modeling, this patent application relates to performing surface-augmented ray-based acoustic modeling that models scattering of acoustic waves by a surface of a device. The acoustic modeling is based on two parameters—a room response (information about acoustics and geometry of the room) and a device response (information about acoustics and geometry of the device). For example, a system can perform acoustic modeling using a combination of the ray-based acoustic modeling (e.g., room response) for modeling the room and an acoustic device dictionary (e.g., device response) for modeling the device surface.

The room response is determined using ray-based acoustic modeling, such as ray tracing. The device response can be measured in an actual environment or simulated and represents an acoustic response of the device to individual acoustic plane waves. The system applies a superposition of the room response and the plane wave scattering from the device response. Thus, the system determines acoustic pressure values to generate microphone audio data using a sum of the device response to each plane wave scaled with the intensity of the plane wave. The system can estimate room impulse response (RIR) data using data from the microphones, and can use the RIR data to perform audio processing such as sound equalization, acoustic echo cancellation, audio beamforming, and/or the like. In addition, in some examples the system can estimate the RIR data for a potential different microphone array configuration and perform simulations using the potential microphone array.

FIG. 1 illustrates a system configured to perform acoustic modeling according to embodiments of the present disclosure. Although FIG. 1, and other figures/discussion illustrate the operation of the system 100 in a particular order, the steps described may be performed in a different order (as well as certain steps removed or added) without departing from the intent of the disclosure.

As illustrated in FIG. 1, the system 100 may comprise a device 110 and/or one or more simulation device(s) 102, which may be communicatively coupled to network(s) 199 and/or other components of the system 100. The device 110 and/or the simulation device(s) 102 may include a room impulse response (RIR) generator 125 configured to generate room impulse response (RIR) data 116 corresponding to a microphone array at a first location in a room. For example, FIG. 1 illustrates that the RIR generator 125 may receive room acoustic characteristics data 112 and device acoustic characteristics data 114 and may use the room acoustic characteristics data 112 and the device acoustic characteristics data 114 to generate the RIR data 116, as described in greater detail below with regard to FIG. 5.

There are two main approaches in room acoustic modeling. A first approach, referred to as wave-based acoustic modeling, is based on solving the actual wave equation numerically. However, wave-based acoustic modeling is computationally intensive and suitable for low frequencies, as the processing requirement grows rapidly as a function of the frequency. Wave-based acoustic modeling typically discretize either space or its bounding surfaces to small elements and model interactions between them. Examples of wave-based acoustic modeling include difference methods and elements methods, such as finite element method (FEM), boundary element method (BEM), and/or the like.

A second approach, referred to as ray-based acoustic modeling, is based on geometrical acoustics in which sound is supposed to act as rays and the wavelength of sound is neglected. Thus, ray-based acoustic modeling ignores wave-based phenomena such as diffraction and interference, which are modeled correctly using wave-based acoustic modeling. However, ray-based acoustic modeling provides an acceptable approximation of room acoustics, without being computationally expensive. Examples of ray-based acoustic modeling include ray tracing, image source method, and/or the like. For ease of illustration, the disclosure may refer to determining an acoustic pressure at a microphone (e.g., generating estimated microphone audio data) and/or determining room impulse response (RIR) data using a ray tracing method. However, the disclosure is not limited thereto, and the system 100 may determine the acoustic pressure and/or the RIR data using other ray-based acoustic modeling, such as the image source method, without departing from the disclosure.

As illustrated in FIG. 1, the room acoustic characteristics data 112 may be generated using a ray tracing method 120, although the disclosure is not limited thereto. The room acoustic characteristics data 112 is determined based on acoustics of a room, and therefore the system 100 may determine the room acoustic characteristics data 112 each time the RIR generator 125 generates the RIR data 116. Thus, the system 100 may use the ray tracing method 120, or other ray-based acoustic modeling techniques, due to its low complexity as the ray tracing method 120 is not computationally expensive.

In a conventional system, the ray tracing method 120 is not suited to model a microphone or a microphone array that is mounted on a rigid surface because a surface dimension is comparable to an acoustic wavelength of an acoustic wave. Thus, the rigid surface causes scattering of acoustic waves (e.g., diffraction), which is not accurately modeled by the ray tracing method 120.

To improve ray-based acoustic modeling, the system 100 uses a combination of the ray-based acoustic modeling (e.g., room acoustic characteristics data 112) for modeling the room and an acoustic device dictionary (e.g., device acoustic characteristics data 114) for modeling the device surface. For example, the system 100 may augment the ray tracing method 120 by applying a superposition of plane wave scattering from the device dictionary of acoustic plane waves. As used herein, this technique may be referred to as a surface-augmented ray tracing (SART) method, although the disclosure is not limited thereto and the system 100 may perform surface-augmented ray-based acoustic modeling without departing from the disclosure.

As described in greater detail below with regard to FIGS. 4A-4C, the device acoustic characteristics data 114 (e.g., device dictionary) may be calculated once for a given device (e.g., device 110 or a prototype device including a microphone array). The device acoustic characteristics data 114 represents the acoustic response of the device to each acoustic plane-wave of interest, completely characterizing the device behavior for each acoustic plane-wave. Thus, the system 100 may use the device acoustic characteristics data 114 to accommodate for the acoustic wave scattering due to the device surface. Each entry of the device acoustic characteristics data 114 has the form $\{z(\omega,\phi,\theta)\}_{\omega,\phi,\theta}$, which represents the acoustic pressure vector (at all microphones) at frequency $\omega$, for an acoustic plane-wave of elevation $\phi_1$ and azimuth $\theta_1$. Thus, a length of each entry of the device acoustic characteristics data 114 corresponds to a number of microphones included in the microphone array.

As illustrated in FIG. 1, the system 100 may generate the RIR data 116 using the device 110 and/or the simulation device(s) 102. For example, the device 110 may generate the RIR data 116 during normal operation, whereas the simulation device(s) 102 may generate the RIR data 116 while simulating a potential microphone array. For ease of explanation, the disclosure may refer to the RIR generator 125 generating the RIR data 116 whether the RIR data 116 is generated during operation of the device 110 or during a simulation generated by the simulation device(s) 102 without departing from the disclosure.

In some examples, the device 110 may be configured to generate the RIR data 116 corresponding to a microphone array of the device 110. Thus, the device 110 may generate the RIR data 116 and then use the RIR data 116 to perform additional processing. For example, the device 110 may use the RIR data 116 to perform acoustic environment detection (e.g., detect a direction and/or distance to acoustically reflective surface(s) in the room), audio equalization, acoustic echo cancellation (AEC) processing, audio beamforming, and/or additional audio processing (e.g., dereverberation), as described in greater detail below with regard to FIG. 6.

The disclosure is not limited thereto, however, and in other examples the simulation device(s) 102 may be configured to perform a simulation of a microphone array to generate the RIR data 116. Thus, the one or more simulation device(s) 102 may perform a simulation of a microphone array in order to evaluate the microphone array. For example, the system 100 may simulate how the selected microphone array will capture audio in a particular room by estimating a room impulse response (RIR) corresponding to the selected microphone array being at a specific location in the room. Using the RIR data 116, the system 100 may simulate a potential microphone array associated with a prototype device prior to actually building the prototype device, enabling the system 100 to evaluate a plurality of microphone array designs having different geometries and select a potential microphone array based on the simulated performance of the potential microphone array. However, the disclosure is not limited thereto and the system 100 may evaluate a single potential microphone array, an existing microphone array, and/or the like without departing from the disclosure.

In some examples, the simulation device(s) 102 may correspond to a server. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

The network(s) 199 may include a local or private network and/or may include a wide network such as the Internet. The device(s) 110/102 may be connected to the network(s) 199 through either wired or wireless connections. For example, the device 110 may be connected to the network(s) 199 through a wireless service provider, over a WiFi or cellular network connection, and/or the like. Other devices may be included as network-connected support devices, such as the simulation device(s) 102, and may connect to the network(s) 199 through a wired connection and/or wireless connection without departing from the disclosure.

As is known and as used herein, "capturing" an audio signal and/or generating audio data includes a microphone transducing audio waves (e.g., sound waves) of captured sound to an electrical signal and a codec digitizing the signal to generate the microphone audio data.

A room impulse response (RIR) corresponds to a system response of a system from its input and output—in this case, a point-to-point system response inside the room. For example, the input to the system (e.g., source signal, such as white noise) corresponds to output audio data used to generate output audio at a first location (e.g., position of a loudspeaker emitting the output audio), while the output of the system (e.g., target signal) corresponds to input audio data generated by the microphone array at a second location (e.g., individual positions of the microphones included in the microphone array capturing a portion of the output audio).

In a conventional system, the RIR is estimated based on an actual physical measurement, with the loudspeaker at the first location generating the output audio and the microphone array at the second location measuring acoustic pressure values to generate the microphone audio data. For example, the output audio data is sent to the loudspeaker at the first location and the microphone array generates the input audio data at the second location. Before determining the RIR, the output audio data (e.g., playback signal $x_p(t)$) and the input audio data (e.g., microphone signal $y_m(t)$)), need to be aligned in both time and frequency, including adjusting for a frequency offset (e.g., clock frequency drift between different clocks), resampling the signals to have the same sampling frequency (e.g., 16 kHz, although the disclosure is not limited thereto), and/or adjusting to compensate for a time offset (e.g., determined as the index of a maximum cross correlation between the playback signal $x_p(t)$ and the microphone signal $y_m(t)$). After time-frequency alignment of the output audio data and the input audio data (e.g., generating aligned microphone signal $\tilde{y}_m(t)$), the system response $\{h(n)\}_{n=0}^{T}$ may be calculated using a cross-correlation as:

$$h_m(n) = \mathbb{E}\{x_p(t)\tilde{y}_m(t+n)\} \quad [1]$$

where $h_m(n)$ is the system response (e.g., RIR) for an individual microphone, $\mathbb{E}$ indicates an expected value (e.g., probability-weighted average of outcome values), $x_p(t)$ is the playback signal (e.g., output audio data), $\tilde{y}_m(t)$ is the time-aligned microphone signal (e.g., input audio data). For microphone arrays, all the microphones are driven by the same clock. Therefore, the time-frequency alignment estimation procedure between the playback signal and the microphone signal only needs to be done with a single microphone and the alignment parameters may be applied to all microphones.

While the example above refers to determining the system response using a cross-correlation calculation, the disclosure is not limited thereto and the system 100 may estimate room impulse response data using other techniques without departing from the disclosure. For example, the system 100 may perform cross-spectrum analysis in the frequency domain, cross-correlation analysis in the time domain, determine an inter-channel response, and/or the like without departing from the disclosure.

To enable the system 100 to simulate the RIR for a selected microphone array without needing to physically measure the RIR using the selected microphone array, the system 100 may combine the ray tracing method and the device acoustic characteristics data 114 (e.g., device dictionary) to separate the impact of room acoustics from the impact of device scattering associated with the microphone array, as described in greater detail below with regard to FIG. 5. For example, the system 100 may use the room acoustic characteristics data 112 and the device acoustic characteristics data 114 to estimate microphone audio data associated with the microphone array. Thus, the input to the system (e.g., source signal, such as white noise) corresponds to an impulse signal modeled at the first location in the room, while the output of the system (e.g., target signal) corresponds to the estimated microphone audio data (e.g., input audio data) simulated based on the microphone array at the second location. The system 100 may generate the RIR data 116 based on the estimated microphone audio data and the impulse signal using the techniques described above.

As illustrated in FIG. 1, the system 100 may determine (130) room acoustic characteristics data 112. For example, the system 100 may perform ray tracing or other ray-based acoustic modeling to generate the room acoustic characteristics data 112, as described in greater detail below with regard to FIG. 5. The system 100 may determine (132) device acoustic characteristics data 114. As the device acoustic characteristics data 114 only need to be determined once for a particular microphone array, the system 100 may retrieve the device acoustic characteristics data 114 from a storage device without departing from the disclosure.

Using the room acoustic characteristics data 112 and the device acoustic characteristics data 114, the system 100 may estimate (134) acoustic pressure values at microphone(s) of the microphone array, as described in greater detail below with regard to FIG. 5. For example, the system 100 may combine the ray-based acoustic modeling (e.g., room acoustic characteristics data 112) for modeling the room and the device acoustic characteristics data 114 for modeling the device surface to generate estimated microphone audio data corresponding to the acoustic pressure values.

Using the estimated microphone audio data, the system 100 may estimate (136) the room impulse response (RIR) data 116, as described in greater detail above. For example, the system 100 may generate the RIR data 116 using a cross-correlation calculation without departing from the disclosure. However, the disclosure is not limited thereto and the system 100 may estimate the RIR data 116 using other techniques without departing from the disclosure. For example, the system 100 may perform cross-spectrum analysis in the frequency domain, cross-correlation analysis in the time domain, determine an inter-channel response, and/or the like without departing from the disclosure.

After generating the RIR data 116, the system 100 may process (138) audio data using the RIR data 116. For example, the system 100 may use the RIR data 116 to perform acoustic environment detection (e.g., detect a direction and/or distance to acoustically reflective surface(s) in the room), audio equalization, acoustic echo cancellation (AEC) processing, audio beamforming, and/or additional audio processing (e.g., dereverberation), as described in greater detail below with regard to FIG. 6. Additionally or alternatively, the system 100 may use the RIR data 116 to simulate a potential microphone array associated with a prototype device prior to actually building the prototype device, enabling the system 100 to evaluate a plurality of microphone array designs having different geometries and select a potential microphone array based on the simulated performance of the potential microphone array. For example, the system 100 may perform simulations associated with room impulse response (RIR) generation, fixed beamformer (FBF) design, configuration files generation, audio front end (AFE) processing, wakeword (WW) and/or automatic speech recognition (ASR) processing, report generation, and/or the like, as described in greater detail below with regard to FIGS. 8-9C.

Acoustic theory tells us that a point source produces a spherical acoustic wave in an ideal isotropic (uniform) medium such as air. Further, the sound from any radiating surface can be computed as the sum of spherical acoustic wave contributions from each point on the surface, including any relevant reflections. In addition, acoustic wave propagation is the superposition of spherical acoustic waves generated at each point along a wavefront. Thus, all linear acoustic wave propagation can be seen as a superposition of spherical traveling waves.

Figure 2A:
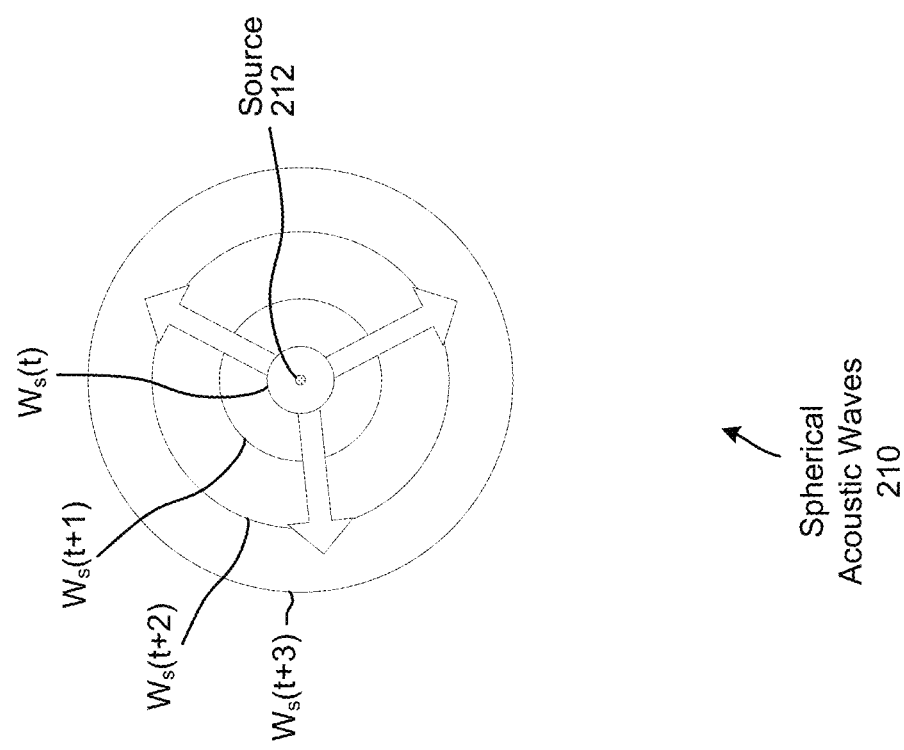

FIGS. 2A-2B illustrate examples of acoustic wave propagation. As illustrated in FIG. 2A, spherical acoustic waves 210 (e.g., spherical traveling waves) correspond to a wave whose wavefronts (e.g., surfaces of constant phase) are spherical (e.g., the energy of the wavefront is spread out over a spherical surface area). Thus, the source 212 (e.g., radiating sound source, such as a loudspeaker) emits spherical traveling waves in all directions, such that the spherical acoustic waves 210 expand over time. This is illustrated in FIG. 2A as a spherical wave $w_s$ with a first arrival having a first radius at a first time $w_s(t)$, a second arrival having a second radius at a second time $w_s(t+1)$, a third arrival having a third radius at a third time $w_s(t+2)$, a fourth arrival having a fourth radius at a fourth time $w_s(t+3)$, and so on.

Additionally or alternatively, acoustic waves can be visualized as rays emanating from the source 212, especially at a distance from the source 212. For example, the acoustic waves between the source 212 and the microphone array can be represented as acoustic plane waves. As illustrated in FIG. 2B, acoustic plane waves 220 (e.g., planewaves) correspond to a wave whose wavefronts (e.g., surfaces of constant phase) are parallel planes. Thus, the acoustic plane waves 220 shift with time t from the source 212 along a direction of propagation (e.g., in a specific direction), represented by the arrow illustrated in FIG. 2B. This is illustrated in FIG. 2B as a plane wave $w_p$ having a first position at a first time $w_p(t)$, a second position at a second time $w_p(t+1)$, a third position at a third time $w_p(t+2)$, a fourth position at a fourth time $w_p(t+3)$, and so on. While not illustrated in FIG. 2B, acoustic plane waves may have a constant value of magnitude and a linear phase, corresponding to a constant acoustic pressure.

Acoustic plane waves are a good approximation of a far-field sound source (e.g., sound source at a relatively large distance from the microphone array), whereas spherical acoustic waves are a better approximation of a near-field sound source (e.g., sound source at a relatively small distance from the microphone array). For ease of explanation, the disclosure may refer to acoustic waves with reference to acoustic plane waves. However, the disclosure is not limited thereto, and the illustrated concepts may apply to spherical acoustic waves without departing from the disclosure. For example, the device acoustic characteristics data may correspond to acoustic plane waves, spherical acoustic waves, and/or a combination thereof without departing from the disclosure.

Figure 3:
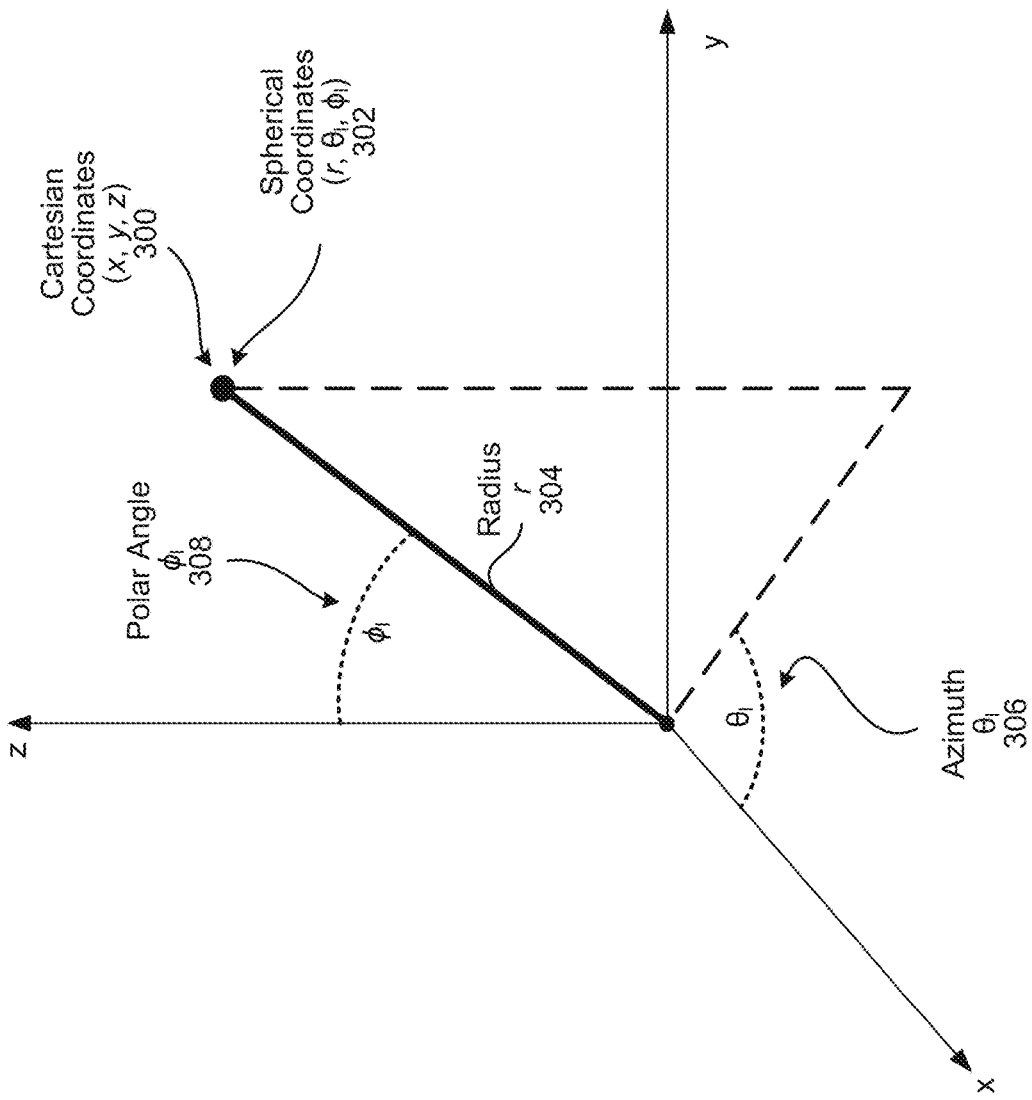
FIG. 3 illustrates an example of spherical coordinates.

FIG. 3 illustrates an example of spherical coordinates, which may be used throughout the disclosure with reference to acoustic waves relative to the microphone array. As illustrated in FIG. 3, Cartesian coordinates (x, y, z) 300 correspond to spherical coordinates (r, $\theta_1$, $\phi_1$) 302. Thus, using Cartesian coordinates, a location may be indicated as a point along an x-axis, a y-axis, and a z-axis using coordinates (x, y, z), whereas using spherical coordinates the same location may be indicated using a radius r 304, an azimuth $\phi_1$ 306 and a polar angle $\phi_1$ 308. The radius r 304 indicates a radial distance of the point from a fixed origin, the azimuth $\phi_1$ 306 indicates an azimuth angle of its orthogonal projection on a reference plane that passes through the origin and is orthogonal to a fixed zenith direction, and the polar angle $\phi_1$ 308 indicates a polar angle measured from the fixed zenith direction. Thus, the azimuth $\phi_1$ varies between 0 and 360 degrees, while the polar angle $\phi_1$ 308 varies between 0 and 180 degrees.

Figure 4A:
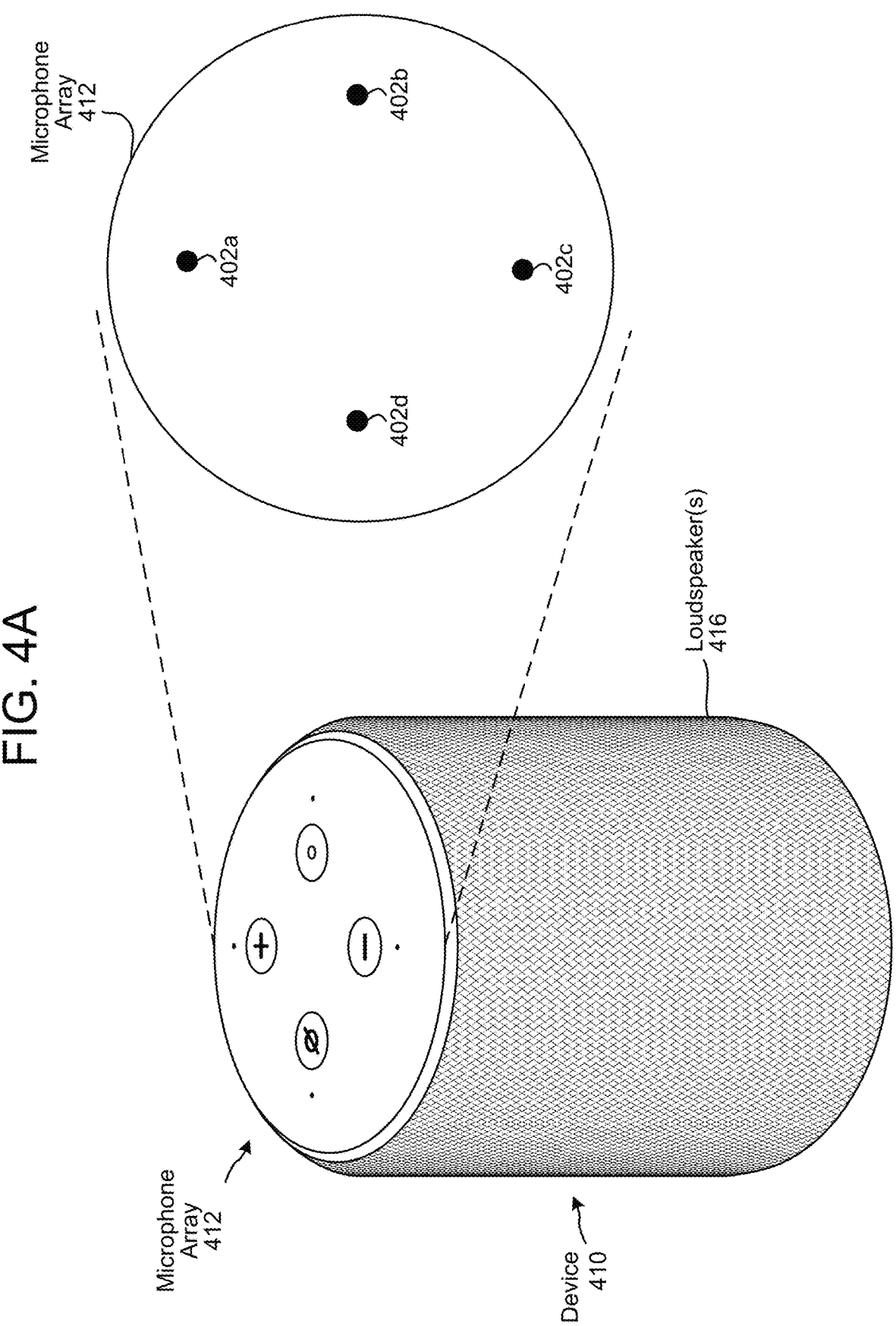
Figure 4C:
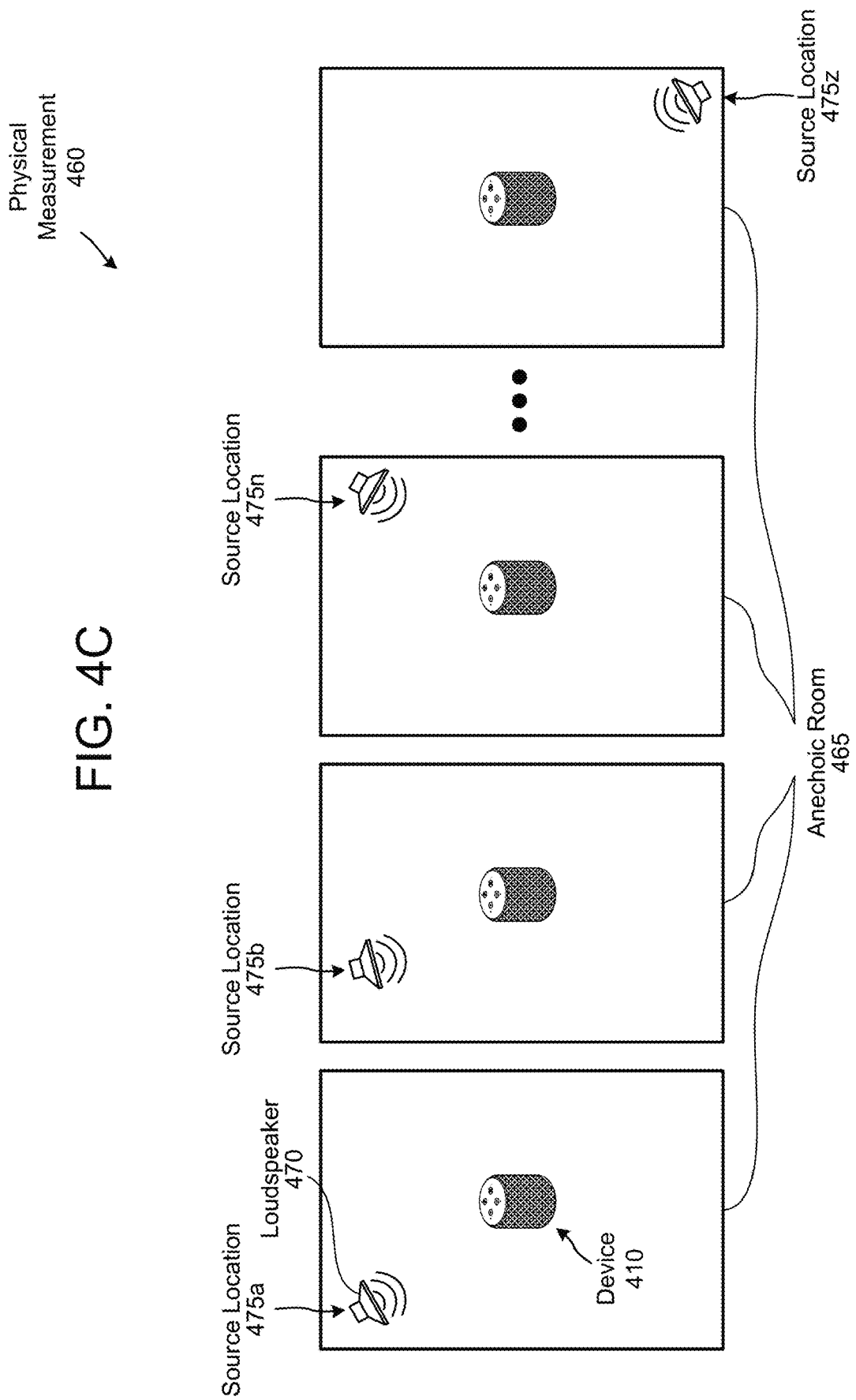

FIGS. 4A-4C illustrate a device having a microphone array and examples of determining a device response via simulation or measurement according to embodiments of the present disclosure. As illustrated in FIG. 4A, a device 410 may include, among other components, a microphone array 412, one or more loudspeaker(s) 416, and other components not illustrated in FIG. 4A. The microphone array 412 may include a number of different individual microphones 402. In the example configuration illustrated in FIG. 4A, the microphone array 412 includes four (4) microphones 402a-402d, although the disclosure is not limited thereto and the number of microphones 402 may vary without departing from the disclosure.

In some examples, the device 410 illustrated in FIG. 4A may correspond to the device 110 described above with regard to FIG. 1. For example, the system 100 may determine device acoustic characteristics data 114 associated with the device 110 and the device 110 may use the device acoustic characteristics data 114 to generate the RIR data 116 during operation. However, the disclosure is not limited thereto, and in other examples the device 410 may correspond to a prototype of a device to be simulated by the simulation device(s) 102 without departing from the disclosure.

The acoustic wave equation is the governing law for acoustic wave propagation in fluids, including air. In the time domain, the homogenous wave equation has the form:

$$\nabla^2 \overline{p} - \frac{1}{c^2} \frac{\partial^2 \overline{p}}{\partial t^2} = 0 \qquad [2a]$$

where p(t) is the acoustic pressure and c is the speed of sound in the medium. Alternatively, the acoustic wave equation may be solved in the frequency domain using the Helmholtz equation to find p(f):

$$\nabla^2 p + k^2 p = 0 \quad [2b]$$

where $k \triangleq 2\pi f/c$ is the wave number. At steady state, the time-domain and the frequency-domain solutions are Fourier pairs. The boundary conditions are determined by the geometry and the acoustic impedance of the difference boundaries. The Helmholtz equation is typically solved using Finite Element Method (FEM) techniques, although the disclosure is not limited thereto and the device 110 may solve using boundary element method (BEM), finite difference method (FDM), and/or other techniques without departing from the disclosure.

To analyze the microphone array 412, the system 100 may determine device acoustic characteristics data 114 associated with the device 410. For example, the device acoustic characteristics data 114 represents scattering due to the device surface (e.g., acoustic plane wave scattering caused by a surface of the device 410). Therefore, the system 100 needs to compute the scattered field at all microphones 402 for each plane-wave of interest impinging on a surface of the device 410. The total wave-field at each microphone of the microphone array 412 when an incident plane-wave $p_i(k)$ impinges on the device 410 has the general form:

$$P_t = P_i + P_s \quad [3]$$

where $P_t$ is the total wave-field, $p_i$ is the incident plane-wave, and $P_s$ is the scattered wave-field.

The device acoustic characteristics data 114 may represent the acoustic response of the device 410 associated with the microphone array 412 to each acoustic wave of interest. The device acoustic characteristics data 114 may include a plurality of vectors, with a single vector corresponding to a single acoustic wave. The number of acoustic waves may vary, and in some examples the acoustic characteristics data may include acoustic plane waves, spherical acoustic waves, and/or a combination thereof. In some examples, the device acoustic characteristics data 114 may include 1024 frequency bins (e.g., frequency ranges) up to a maximum frequency (e.g., 8 kHz, although the disclosure is not limited thereto). Thus, the system 100 may use the device acoustic characteristics data 114 to generate RIR data 116 with a length of up to 2048 taps, although the disclosure is not limited thereto.

The entries (e.g., values) for a single vector represent an acoustic pressure indicating a total field at each microphone (e.g., incident acoustic wave and scattering caused by the microphone array) for a particular background acoustic wave. Each entry of the device acoustic characteristics data 114 has the form $\{z(\omega,\phi,\theta)\}_{\omega,\phi,\theta}$, which represents the acoustic pressure vector (at all microphones) at frequency $\omega$, for an acoustic wave of elevation $\phi_1$ and azimuth $\theta_1$. Thus, a length of each entry of the device acoustic characteristics data 114 corresponds to a number of microphones included in the microphone array.

These values may be simulated by solving a Helmholtz equation or may be directly measured using a physical measurement in an anechoic room with a distance point source (e.g., loudspeaker). For example, using techniques such as finite element method (FEM), boundary element method (BEM), finite difference method (FDM), and/or the like, the system 100 may calculate the total wave-field at each microphone. Thus, a number of entries in each vector corresponds to a number of microphones in the microphone array, with a first entry corresponding to a first microphone, a second entry corresponding to a second microphone, and so on.

In some examples, the system 100 may determine the device acoustic characteristics data 114 by simulating the microphone array 412 using wave-based acoustic modeling. For example, FIG. 4B illustrates an example using a finite element method (FEM), which models the device 410 using a FEM mesh 450. To have a true background acoustic wave, the external boundary should be open and non-reflecting. To mimic an open-ended boundary, the system 100 may use a perfectly matched layer (PML) 452 to define a special absorbing domain that eliminates reflection and refractions in the internal domain that encloses the device 410. While FIG. 4B illustrates using FEM processing, the disclosure is not limited thereto and the system 100 may use boundary element method (BEM) processing and/or other wave-based acoustic modeling techniques without departing from the disclosure.

The system 100 may calculate the total wave-field at all frequencies of interest with a background acoustic wave, where the surface of the device 410 is modeled as a sound hard boundary. If a surface area of an individual microphone is much smaller than a wavelength of the acoustic wave, the microphone is modeled as a point receiver on the surface of the device 410. If the surface area is not much smaller than the wavelength, the microphone response is computed as an integral of the acoustic pressure over the surface area.

Using the FEM model, the system 100 may calculate an acoustic pressure at each microphone (at each frequency) by solving the Helmholtz equation numerically with a background acoustic wave. This procedure is repeated for each possible acoustic wave and each possible direction to generate a full dictionary that completely characterizes a behavior of the device 410 for each acoustic wave (e.g., device response for each acoustic wave). Thus, the system 100 may simulate the device acoustic characteristics data 114 and may apply the device acoustic characteristics data 114 to any room configuration.

In other examples, the system 100 may determine the device acoustic characteristics data 114 described above by physical measurement 460 in an anechoic room 465, as illustrated in FIG. 4C. For example, the system 100 may measure acoustic pressure values at each of the microphones 402 in response to an input (e.g., impulse) generated by a loudspeaker 470. The input may correspond to white noise or other waveforms, and may include a frequency sweep across all frequency bands of interest (e.g., input signal includes white noise within all desired frequency bands).

To model all of the potential acoustic waves, the system 100 may generate the input using the loudspeaker 470 in all possible locations in the anechoic room 465. For example, FIG. 4C illustrates examples of the loudspeaker 470 generating inputs at multiple source locations 475 along a horizontal direction, such as a first input at a first source location 475a, a second input at a second source location 475b, and so on until an n-th input at an n-th source location 475n. This is intended to illustrate that the loudspeaker 470 generates the input at every possible source location 475 associated with a first horizontal row. In addition, the system 100 may generate the input using the loudspeaker 470 at every possible source location 475 in every horizontal row without departing from the disclosure. Thus, the loudspeaker 470 may generate inputs at every possible source location 475 throughout the anechoic room 465, until finally generating a z-th input at a z-th source location 475z.

Figure 5:
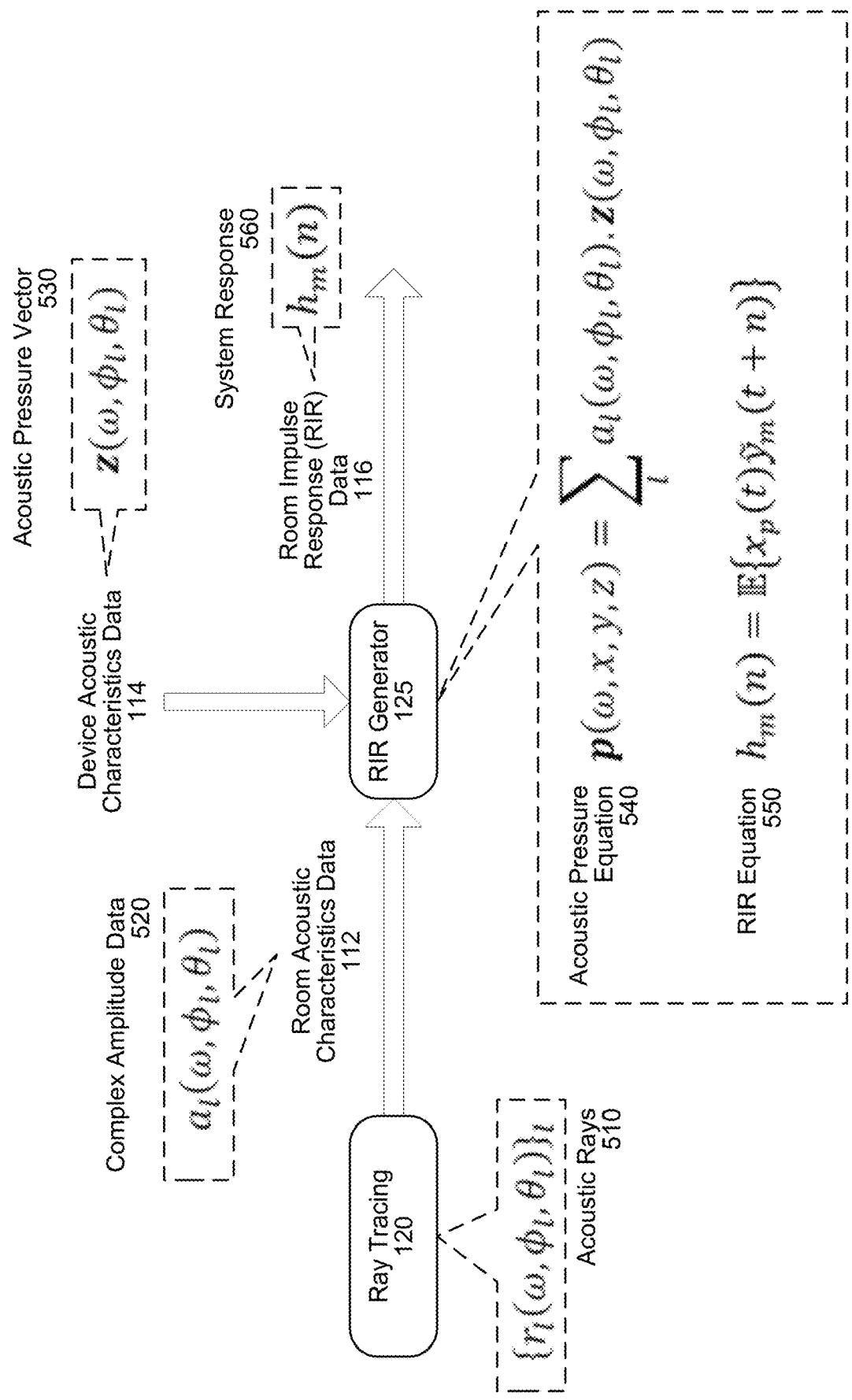
FIG. 5 illustrates an example of performing ray tracing using a combination of a room response and a device response according to embodiments of the present disclosure.

While calculating the direct solution of the Helmholtz equation using FEM techniques is complicated and computationally expensive, the system 100 may instead model the room acoustics using the surface-augmented ray tracing method illustrated in FIG. 5. For example, the system 100 may generate the RIR using two components; the room component (e.g., room response) and the device surface component (e.g., device response). Using the ray tracing method 120, the room component is modeled by replacing the concept of a sound wave with the concept of a sound ray, while neglecting the wavelength of the sound wave. Thus, instead of approximating the wave-field at any point inside a room as a superposition of acoustic plane waves, the ray tracing method 120 models an ideal impulse response from a source to a receiver by identifying all possible sound reflection paths (e.g., acoustic rays).

As described above, the device surface component is determined by simulating or measuring the scattered acoustic pressure at each microphone on the device for each incident acoustic plane wave. Because of the linearity of the wave equation, the total acoustic pressure at each microphone on the device surface is determined using the superposition of plane wave responses from the device surface component (e.g., the device response to each plane wave), where the direction and amplitude of each acoustic plane wave is calculated using the ray tracing method 120. Thus, the total acoustic pressure at each microphone is the sum of the responses to each acoustic plane wave scaled with the intensity of the acoustic plane wave.

FIG. 5 illustrates an example of performing ray tracing using a combination of a room response and a device response according to embodiments of the present disclosure. As described above, the system 100 may use the ray tracing method 120, or other ray-based acoustic modeling techniques, for modeling the room and may combine the ray tracing method 120 with the device acoustic characteristics data 114 for modeling the device surface.

As illustrated in FIG. 5, the ray tracing method 120 for room acoustics generates, at target point (x,y,z) in the room, a set of acoustic rays 510 $\{r_i(\omega,\phi_i,\theta_i)\}_i$, such that an individual acoustic ray $r_i$ is associated with an elevation $\phi_i$ and azimuth $\theta_i$ for a frequency $\omega$. For example, the acoustic rays 510 are generated from reflections on the hard boundaries in the room (e.g., acoustically reflective surfaces of the room). Each ray $r_i$ of the acoustic rays 510 is associated with a complex amplitude $a_i$. Thus, based on the acoustic rays 510, the system 100 may generate the room acoustic characteristics data 112, represented in FIG. 5 as complex amplitude data 520. For example, each entry of the room acoustic characteristics data 112 may have the form $a_1(\omega, \phi_1, \theta_1)$, which represents the complex amplitude $a_1$ at frequency $\omega$, for an acoustic ray having an elevation $\phi_1$ and azimuth $\theta_1$.

As described above with regard to FIGS. 4A-4C, the device acoustic characteristics data 114 represents the acoustic response of the device 410 to each acoustic plane-wave of interest, completely characterizing the device behavior for each acoustic plane-wave. Thus, the system 100 may use the device acoustic characteristics data 114 to accommodate for the acoustic wave scattering due to the device surface. Each entry of the device acoustic characteristics data 114 has the form $\{z(\omega,\phi,\theta)\}_{\omega,\phi,\theta}$, which represents an acoustic pressure vector 530 (e.g., acoustic pressure at all microphones) at frequency $\omega$, for an acoustic plane-wave of elevation $\phi_1$ and azimuth $\theta_1$. Thus, a length of each entry of the device acoustic characteristics data 114 corresponds to a number of microphones included in the microphone array. For example, as the microphone array 412 illustrated in FIG. 4A includes four microphones, each entry of the device acoustic characteristics data 114 may correspond to an acoustic pressure vector 530 including four acoustic pressure values (e.g., individual acoustic pressure values for each of the microphones 402).

As illustrated in FIG. 5, the RIR generator 125 may combine the room acoustic characteristics data 112 and the device acoustic characteristics data 114 using an acoustic pressure equation 540, shown below:

$$p(\omega,x,y,z)=\Sigma_i a_i(\omega,\phi_i,\theta_i)\cdot z(\omega,\phi_i,\theta_i) \quad [4]$$

where a center of the device 410 is considered to be at point (x, y, z) in the room, $p(\omega, x, y, z)$ is the total acoustic pressure at the microphone(s) of the device 410, $a_1(\omega, \phi_1,\theta_1)$ is the complex amplitude $a_1$ at frequency $\omega$ for an acoustic ray having an elevation $\phi_1$ and azimuth $\theta_1$, and $z(\omega, \phi_1,\sigma_1)$ is an acoustic pressure vector at frequency $\omega$ for an acoustic plane-wave of elevation $\phi_1$ and azimuth $\theta_1$. Thus, each complex amplitude $a_i(\omega, \phi_i, \theta_i)$ is an entry from the room acoustic characteristics data 112 for an individual acoustic ray $r_1$ and each acoustic pressure vector $z(\omega, \phi_i,\theta_i)$ is an entry from the device acoustic characteristics data 114 that corresponds to an acoustic plane wave that has the same direction as the corresponding acoustic ray $r_1$. Thus, the total acoustic pressure at each microphone is the sum of the responses to each acoustic plane wave scaled with the intensity of the acoustic plane wave.

The total acoustic pressure calculated using the acoustic pressure equation 540 corresponds to estimated microphone audio data. For example, the total acoustic pressure represents estimated microphone audio data as though generated by the microphone array 412, at a first location, capturing an impulse signal generated at a second location. To determine the room impulse response (RIR) data 116, the system 100 may compare the estimated microphone audio data to the impulse signal. Thus, the RIR data 116 represents a system response between the second location of the impulse signal (e.g., where the system 100 simulates a loudspeaker generating the impulse signal) and a first location of the microphone array 412 of the device 410.

The system 100 may determine the RIR data 116 using cross-correlation analysis in the time domain, cross-spectrum analysis in the frequency domain, and/or using other techniques without departing from the disclosure. To illustrate an example of performing cross-correlation analysis in the time domain, the system 100 may perform Inverse Fast Fourier Transform (IFFT) processing to convert the estimated microphone audio data from the frequency domain (e.g., $\tilde{Y}_m(\omega)$) to the time domain (e.g., $\tilde{y}_m(t)$).

As illustrated in FIG. 5, the system 100 may determine the system response $h_m(n)$ 560 (e.g., RIR data 116) using RIR equation 550, which corresponds to Equation [1] described above. Thus, the system 100 may determine the RIR data 116 associated with the microphone array 412 by comparing the time-aligned estimated microphone audio data $\tilde{y}_m(t)$ to the impulse signal $x_p(t)$. In this example, the estimated microphone audio data $\tilde{y}_m(t)$ is time-aligned to the impulse signal $x_p(t)$, which corresponds to the playback signal (e.g., output audio data) simulated by the system 100.

Figure 6:
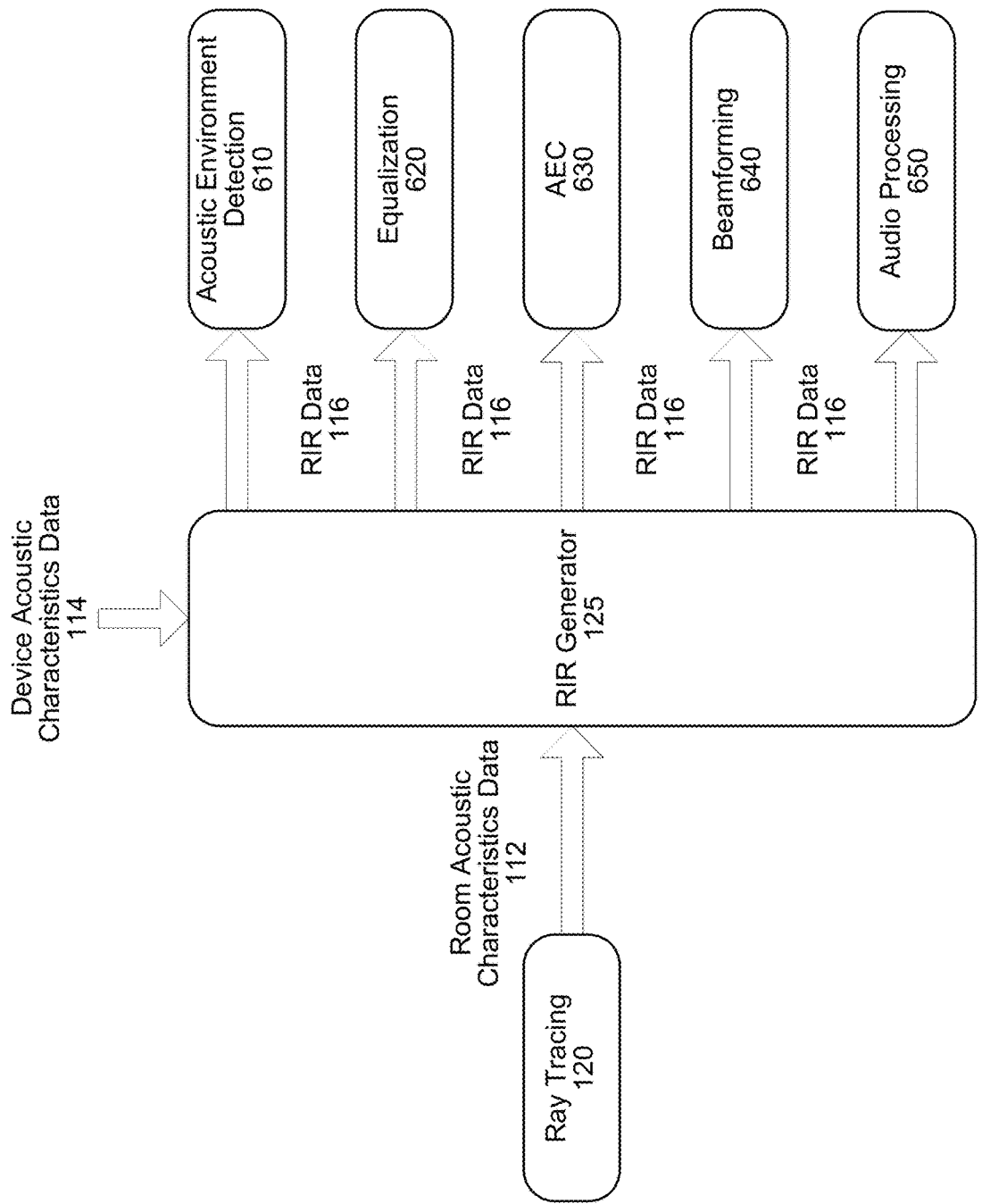
FIG. 6 illustrates examples of processing that may use room impulse response data according to embodiments of the present disclosure.

FIG. 6 illustrates examples of processing that may use room impulse response data according to embodiments of the present disclosure. As illustrated in FIG. 6, the system 100 may use the room acoustic characteristics data 112 and the device acoustic characteristics data 114 to generate the RIR data 116, as described in greater detail above.

Determining an estimate of a room impulse response may be beneficial for a variety of different applications, including improving the sound quality of output audio generated by the device 110, improving echo cancellation for speech recognition, improving audio beamforming, and/or the like. For example, FIG. 6 illustrates that the system 100 may use the RIR data 116 to perform acoustic environment detection 610, equalization 620, acoustic echo cancellation (AEC) 630, beamforming 640, and/or additional audio processing 650, such as dereverberation processing, although the disclosure is not limited thereto.

A room impulse response (RIR) of a room (e.g., location or environment) corresponds to acoustic characteristics of the room. Measured over time in an ongoing fashion, the device 110 may be able to generate a consistent picture of the RIR and reverberant qualities of the environment, thus better enabling the device 110 to determine or approximate where it is located in relation to walls or corners of the environment (assuming the device 110 is stationary). Further, if the device 110 is moved, the device 110 may be able to determine this change by noticing a change in the RIR pattern and may determine distances/directions to walls using the RIR. Thus, the room impulse response enables the device 110 to perform wall detection, range estimation, and/or angular estimation.

As described below, the device 110 may perform acoustic environment detection 610 to determine a location of the device 110 within the room, a physical layout of the room, whether the device 110 is in a corner (e.g., where two or more walls or acoustically reflective surfaces meet) of the room (e.g., corner detection), or the like. In some examples, the device 110 may perform equalization 620 to adjust the sound equalization of output audio generated by the device 110 based on the information determined during the acoustic environment detection 610. For example, the device 110 may use first equalization settings if the device 110 is located in the center of a large room, but may use second equalization settings if the device 110 is located in a corner near two acoustically reflective surfaces.

As described above, the MR may vary based on a size of the room, a number of acoustically reflective surfaces (e.g., walls, ceilings, large objects, etc.), a location of the device 110 within the room, and/or the like. For example, loudspeakers of the device 110 may generate audible sounds at a first time and, at a second time soon after the first time, the microphone array of the device 110 may detect strong original sound waves (e.g., incident sound waves) generated by the loudspeakers, which may be referred to as "direct sound." If the device 110 is located in a center of a relatively large room (e.g., relatively large distance between the device 110 and a nearest acoustically reflective surface), there may be a lengthy time delay before a third time that the microphone array detects reflected sound waves that are reflected by the acoustically reflective surfaces, which may be referred to as "reflections." As a magnitude of a sound wave is proportional to a distance traveled by the sound wave, the reflected sound waves may be relatively weak in comparison to the incident sound waves. In contrast, if the room is relatively small and/or the device 110 is located near an acoustically reflective surface, there may be a relatively short time delay before the microphone array detects the reflected sound waves at the third time and the reflected sound waves may be stronger in comparison to the incident sound waves. If a first acoustically reflective surface is in proximity to the device 110 and a second acoustically reflective surface is distant from the device 110, the device 110 may detect "early reflections" reflected by the first acoustically reflective surface prior to detecting "late reflections" reflected by the second acoustically reflective surface.

For ease of explanation, the following descriptions may refer to the device 110 being located in a "room" and determining a "room impulse response" associated with the room. However, the disclosure is not limited thereto and the device 110 may be located in an "environment" or "location" (e.g., concert hall, theater, outdoor theater, outdoor area, etc.) without departing from the disclosure. Thus, the device 110 may determine an impulse response associated with the environment/location (e.g., environment impulse response, location impulse response, etc.), even if the environment/location does not correspond to a room per se, without departing from the disclosure.

For ease of explanation, the following descriptions may refer to a "wall" or "candidate wall" in order to provide a clear illustration of one or more techniques for estimating a distance and/or direction associated with an acoustically reflective surface. However, this is intended to provide a simplified example and the disclosure is not limited thereto. Instead, techniques used by the device 110 to estimate a distance and/or direction associated with a candidate wall may be applied to other acoustically reflective surfaces without departing from the present disclosure. Thus, while the following description may refer to techniques for determining a distance and/or direction associated with a candidate wall, one of skill in the art may apply the disclosed techniques to estimate a distance and/or direction associated with any acoustically reflective surface (e.g., ceiling, floor, object, etc.).

If a loudspeaker of the device 110 generates output audio at a first time, the microphone array may detect direct sound, which corresponds to incident sound waves propagating directly from the loudspeaker to the microphone array, at a second time soon after the first time. At a third time after the second time, the microphone array may detect early reflections, which correspond to reflected sound waves that are reflected by nearby walls. At a fourth time after the third time, the microphone array may detect late reflections, which correspond to reflected sound waves that are reflected by distant walls. Thus, the direct sound corresponds to a first peak of the room impulse response, which occurs at a first time and has a relatively large amplitude (e.g., magnitude of the first peak is relatively high). The early reflections correspond to a first series of peaks that occur after a short delay during a second time range and have smaller amplitudes than the first peak. Finally, the late reflections correspond to a second series of peaks that occur after a lengthy delay during a third time range and have smaller amplitudes than the first series of peaks.

A time delay of a reflection is proportional to a distance traveled by the reflected sound waves. Thus, the early reflections correspond to candidate walls in proximity to the device 110 and the late reflections correspond to candidate walls that are distant from the device 110. Based on the time delay associated with an individual peak in the room impulse response, the device 110 may determine a distance from the device 110 to a candidate wall corresponding to the individual peak.

To illustrate an example, the device 110 may determine a first time delay associated with a first peak represented in the RIR data 116. Knowing the first time delay, the device 110 may determine a first distance associated with the first peak (e.g., direct sound), which corresponds to a loudspeaker-microphone distance d(0) (e.g., distance between the loudspeaker(s) and the first microphone). The device 110 may determine the first distance (e.g., d(0)) by multiplying the first time delay by the speed of sound (e.g., 343 m/s). Additionally or alternatively, the device 110 may already know the loudspeaker-microphone distance d(0) based on a configuration of the device 110 (e.g., the device 110 is programmed with the fixed distance between the loudspeaker(s) and the microphone array) without departing from the disclosure.

Knowing the speaker-microphone distance d(0), the device 110 may determine a distance travelled by each reflection in the room impulse response data, the distance given by:

$$d(n) = d(0) + n \cdot T_s \cdot 343 \frac{m}{s}, \forall n > 0 \qquad [5]$$

where d(n) is the distance travelled by the reflected sound waves, d(0) is the speaker-microphone distance, n is the reflection (e.g., lag index) associated with the reflected sound waves, $T_s$ is a time delay (in seconds) associated with the reflection (e.g., time associated with a peak in the room impulse response data), and $$343 \frac{m}{s}$$

is the speed of sound. The lag-specific (e.g., reflection-specific) regularization parameter is then obtained as:

$$\lambda_1(n) = \frac{\lambda}{d(n)} \qquad [6]$$

where $\lambda_1(n)$ is the lag-specific regularization parameter (e.g., parameter value unique to an individual reflection or lag index), $\lambda$ is a common scaling factor used for all lag indexes, d(n) is the lag-specific distance (e.g., distance traveled by the reflected sound waves), and n is the reflection (e.g., lag index) associated with the reflected sound waves.

Using time delays associated with the early reflections represented in the RIR data 116, the device 110 may determine direction(s) and/or distance(s) to acoustically reflective surfaces in proximity to the device 110. The device 110 may use these direction(s) and/or distance(s) to perform acoustic environment detection 610. In some examples, the device 110 may determine a specific position of the device 110 relative to the acoustically reflective surfaces and determine equalization settings and other parameters accordingly. However, the disclosure is not limited thereto, and in other examples the device 110 may determine an acoustic environment category associated with the device 110, such as whether the device 110 is in proximity to multiple acoustically reflective surfaces (e.g., in a corner or cabinet), the device 110 is in proximity to a single acoustically reflective surface (e.g., along a wall), or the device 110 is not in proximity to an acoustically reflective surface (e.g., in the middle of the room).

The device 110 may use the acoustic environment detection 610 or acoustic environment category to improve sound equalization prior to generating the output audio, taking into account acoustic characteristics of the room to improve the sound quality of the output audio. To illustrate an example, if the device 110 is positioned in a corner of the room, the output audio may be perceived as having too much bass, whereas if the device 110 is positioned on an island in the middle of the room, the output audio may be perceived as having too little bass. Thus, by determining the RIR data 116, the device 110 may perform dynamic sound equalization to generate consistent output audio regardless of a position of the device 110 relative to acoustically reflective surfaces.

In some examples, the device 110 may use the RIR data 116 to perform acoustic echo cancellation (AEC) 630. For example, the device 110 may perform echo cancellation by generating an estimate of an echo signal (e.g., portion of output audio recaptured by the microphone array of the device 110) and subtracting the echo signal from the microphone audio data to generate isolated audio data. During AEC processing, the device 110 may determine the echo signal using an adaptive filter. For example, the device 110 may update adaptive filter coefficient values of the adaptive filter to minimize the echo signal represented in the isolated audio data. In some examples, the RIR data 116 may correspond to the adaptive filter coefficient values, although the disclosure is not limited thereto.

To illustrate an example, the device 110 may use the RIR data 116 to generate an estimated transfer function $\hat{h}(n)$ that models an acoustic echo (e.g., impulse response) between a loudspeaker and an individual microphone in the microphone array. For example, the adaptive filter may include a first echo estimation filter block that uses a first estimated transfer function $\hat{h}_1(n)$ to model a first transfer function $h_{a1}(n)$ between the loudspeaker and a first microphone of the microphone array, a second echo estimation filter block that uses a second estimated transfer function $\hat{h}_2(n)$ to model a second transfer function $h_{a2}(n)$ between the loudspeaker and a second microphone, and so on.

The echo estimation filter blocks use the estimated transfer functions (e.g., $h_1(n)$ and $h_2(n)$) to produce estimated echo audio data (e.g., first estimated echo audio data for the first microphone, second estimated echo audio data for a second microphone, etc.). For example, the device 110 may convolve playback audio data (e.g., after compensating for distortion, variable delay, drift, skew and/or frequency offset) with the estimated transfer functions $\hat{h}(n)$ (e.g., estimated impulse responses of the room) to generate the estimated echo audio data. Thus, the device 110 may convolve the playback audio data and the first estimated transfer function $\hat{h}_1(n)$ to generate first estimated echo data, which models a portion of first microphone audio data (e.g., output of the first microphone), may convolve the second playback audio data and the second estimated transfer function $\hat{h}_2(n)$ to generate the second estimated echo audio data, which models a portion of second microphone audio data (e.g., output of the second microphone), and so on. As described above, the device 110 may determine the estimated echo audio data using adaptive filters. For example, the adaptive filters may be normalized least means squared (NLMS) finite impulse response (FIR) adaptive filters that adaptively filter the playback audio data using filter coefficients, although the disclosure is not limited thereto.

If the device 110 includes multiple loudspeakers, a multi-channel acoustic echo canceller (MC-AEC) component may perform acoustic echo cancellation similarly to the technique described above. Thus, the MC-AEC component may calculate estimated transfer functions h(n), each of which models an acoustic echo (e.g., impulse response) between an individual loudspeaker and an individual microphone in the microphone array.

In some examples, the device 110 may include a beamformer that may perform audio beamforming 640 on the microphone audio data to determine target audio data (e.g., audio data corresponding to an utterance or desired speech). Audio beamforming, also referred to as audio array processing, uses a microphone array having multiple microphones that are spaced from each other at known distances. Sound originating from a source is received by each of the microphones. However, because each microphone is potentially at a different distance from the sound source, a propagating sound wave arrives at each of the microphones at slightly different times. This difference in arrival time results in phase differences between audio signals produced by the microphones. The phase differences can be exploited to enhance sounds originating from chosen directions relative to the microphone array.

Beamforming uses signal processing techniques to combine signals from the different microphones so that sound signals originating from a particular direction are emphasized while sound signals from other directions are deemphasized. More specifically, signals from the different microphones are combined in such a way that signals from a particular direction experience constructive interference, while signals from other directions experience destructive interference. The parameters used in beamforming may be varied to dynamically select different directions, even when using a fixed-configuration microphone array.

Using the plurality of microphones included in the microphone array, the device 110 may employ beamforming techniques to isolate desired sounds for purposes of converting those sounds into audio signals for speech processing by the system. Thus, beamforming is the process of applying a set of beamformer coefficients to audio signal data to create beampatterns, or effective directions of gain or attenuation. A given beampattern may be used to selectively gather signals from a particular spatial location where a signal source is present. The selected beampattern may be configured to provide gain or attenuation for the signal source. For example, the beampattern may be focused on a particular user's head allowing for the recovery of the user's speech while attenuating noise from an operating air conditioner that is across the room and in a different direction than the user relative to a device that captures the audio signals.

Such spatial selectivity by using beamforming allows for the rejection or attenuation of undesired signals outside of the beampattern. The increased selectivity of the beampattern improves signal-to-noise ratio for the audio signal. By improving the signal-to-noise ratio, the accuracy of speaker recognition performed on the audio signal is improved.

The processed data from the beamformer module may then undergo additional filtering or be used directly by other modules. For example, a filter may be applied to processed data which is acquiring speech from a user to remove residual audio noise from a machine running in the environment.

The device 110 may perform beamforming to determine a plurality of portions or sections of audio received from a microphone array (e.g., directional portions, which may be referred to as directional audio data). To illustrate an example, the device 110 may use a first beamforming configuration that includes six portions or sections. For example, the device 110 may include six different microphones, may divide an area around the device 110 into six sections or the like. However, the present disclosure is not limited thereto and the number of microphones in the microphone array and/or the number of portions/sections in the beamforming may vary. For example, the device 110 may use a second beamforming configuration including eight portions/sections without departing from the disclosure. Additionally or alternatively, the number of portions/sections generated using beamforming does not depend on the number of microphones in the microphone array. For example, the device 110 may include twelve microphones in the microphone array but may determine three portions, six portions or twelve portions of the audio data without departing from the disclosure.

The beamformer may include a fixed beamformer (FBF) and/or an adaptive noise canceller (ANC), enabling the beamformer to isolate audio data associated with a particular direction. The FBF may be configured to form a beam in a specific direction so that a target signal is passed and all other signals are attenuated, enabling the beamformer to select a particular direction (e.g., directional portion of the microphone audio data). In contrast, a blocking matrix may be configured to form a null in a specific direction so that the target signal is attenuated and all other signals are passed (e.g., generating non-directional audio data associated with the particular direction).

The beamformer may generate fixed beamforms (e.g., outputs of the FBF) or may generate adaptive beamforms (e.g., outputs of the FBF after removing the non-directional audio data output by the blocking matrix) using a Linearly Constrained Minimum Variance (LCMV) beamformer, a Minimum Variance Distortionless Response (MVDR) beamformer or other beamforming techniques. For example, the beamformer may receive audio input, determine six beamforming directions and output six fixed beamform outputs and six adaptive beamform outputs. In some examples, the beamformer may generate six fixed beamform outputs, six LCMV beamform outputs and six MVDR beamform outputs, although the disclosure is not limited thereto. Additionally or alternatively, the device 110 may perform beamforming using other techniques known to one of skill in the art and the disclosure is not limited to the techniques described above.

The transfer functions h(n) characterize the acoustic "impulse response" of the room (e.g., room impulse response (RIR)) relative to the individual components. The impulse response, or impulse response function, of the room characterizes the signal from a microphone when presented with a brief input signal (e.g., an audible noise), called an impulse. The impulse response describes the reaction of the system as a function of time. If the impulse responses associated with the microphone array and/or the loudspeaker(s) are known, and the content of the playback audio data output by the loudspeaker(s) is known, then the transfer functions h(n) can be used to estimate the actual loudspeaker-reproduced sounds that will be received by an individual microphone in the microphone array. Additionally or alternatively, the room impulse response enables the device 110 to generate transfer functions that can be used to estimate the actual loudspeaker-reproduced sounds that will be received by a user in the room listening to the output audio. Thus, the device 110 may improve the perceived sound quality associated with the output audio.

While beamforming alone may increase a signal-to-noise (SNR) ratio of an audio signal, combining known acoustic characteristics of an environment (e.g., a room impulse response (RIR)) and heuristic knowledge of previous beampattern lobe selection may provide an even better indication of a speaking user's likely location within the environment. In some instances, a device includes multiple microphones that capture audio signals that include user speech. As is known and as used herein, "capturing" an audio signal includes a microphone transducing audio waves of captured sound to an electrical signal and a codec digitizing the signal. The device may also include functionality for applying different beampatterns to the captured audio signals, with each beampattern having multiple lobes. By identifying lobes most likely to contain user speech using the combination discussed above, the techniques enable devotion of additional processing resources of the portion of an audio signal most likely to contain user speech to provide better echo canceling and thus a cleaner SNR ratio in the resulting processed audio signal.

By tracking which lobe of a beampattern the device most often selects as having the strongest spoken signal path over time, the device 110 may begin to notice patterns in which lobes are selected. If a certain set of lobes (or microphones) is selected, the device 110 can heuristically determine the user's typical speaking position in the environment. The device 110 may devote more CPU resources to digital signal processing (DSP) techniques for that lobe or set of lobes. For example, the device 110 may run acoustic echo cancelation (AEC) at full strength across the three most commonly targeted lobes, instead of picking a single lobe to run AEC at full strength. The techniques may thus improve subsequent automatic speech recognition (ASR) results as long as the device 110 is not rotated or moved. And, if the device 110 is moved, the techniques may help the device to determine this change by comparing current RIR results to historical ones to recognize differences that are significant enough to cause the device 110 to begin processing the signal coming from all lobes approximately equally, rather than focusing only on the most commonly targeted lobes.

Figure 7:
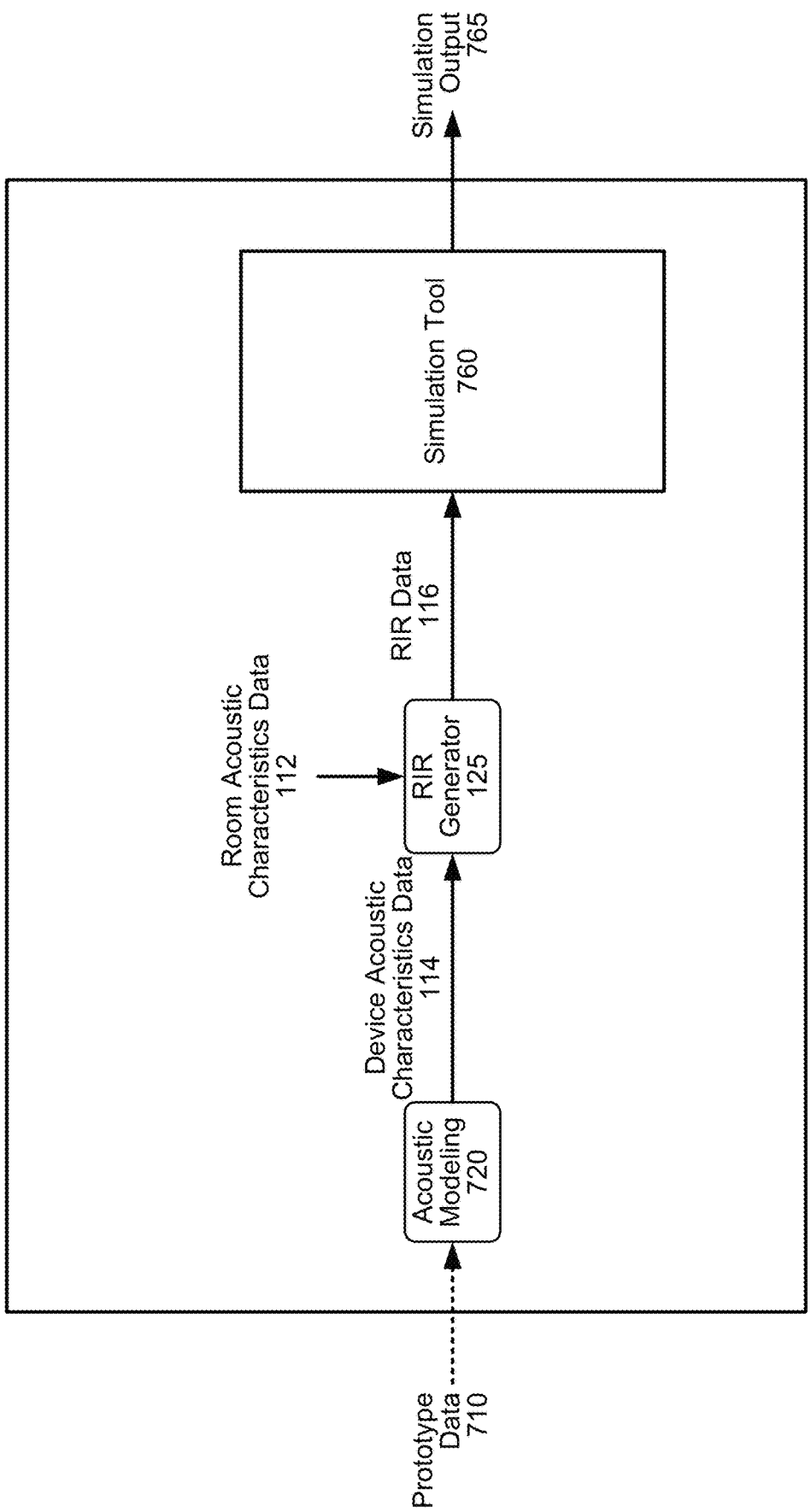
FIG. 7 illustrates an example of performing a simulation of a microphone array according to embodiments of the present disclosure.

FIG. 7 illustrates an example of performing a simulation of a microphone array according to embodiments of the present disclosure. As illustrated in FIG. 7, the system 100 may optionally generate prototype data 710, such as computer-aided design (CAD) data, corresponding to a model of a device to be simulated. The system 100 may perform acoustic modeling 720 on the prototype data 710 to determine device acoustic characteristics data 114, as described above with regard to FIG. 4B. However, the disclosure is not limited thereto and in some examples the system 100 may measure the device acoustic characteristics data 114, as described above with regard to FIG. 4C, without departing from the disclosure.

As described above with regard to FIG. 1, the system 100 may generate room acoustic characteristics data 112 for a particular room using ray tracing techniques. Using the room acoustic characteristics data 112 and the device acoustic characteristics data 114, the room impulse response (RIR) generator 125 may generate RIR data 116 corresponding to the microphone array in the particular room. A simulation tool 760 may receive the RIR data 116 and perform a simulation to generate simulation output 765. In some examples, the system 100 may generate RIR data 116 corresponding to an actual room in which the device 110 is located. Thus, the system 100 may use the simulation output 765 to measure and/or improve an estimated performance of the device 110 without departing from the disclosure. However, the disclosure is not limited thereto, and in other examples the system 100 may generate the RIR data 116 corresponding to a simulated room. Thus, the system 100 may use the simulation output 765 to estimate a performance of the device 110 in the particular room without departing from the disclosure.

Figure 8:
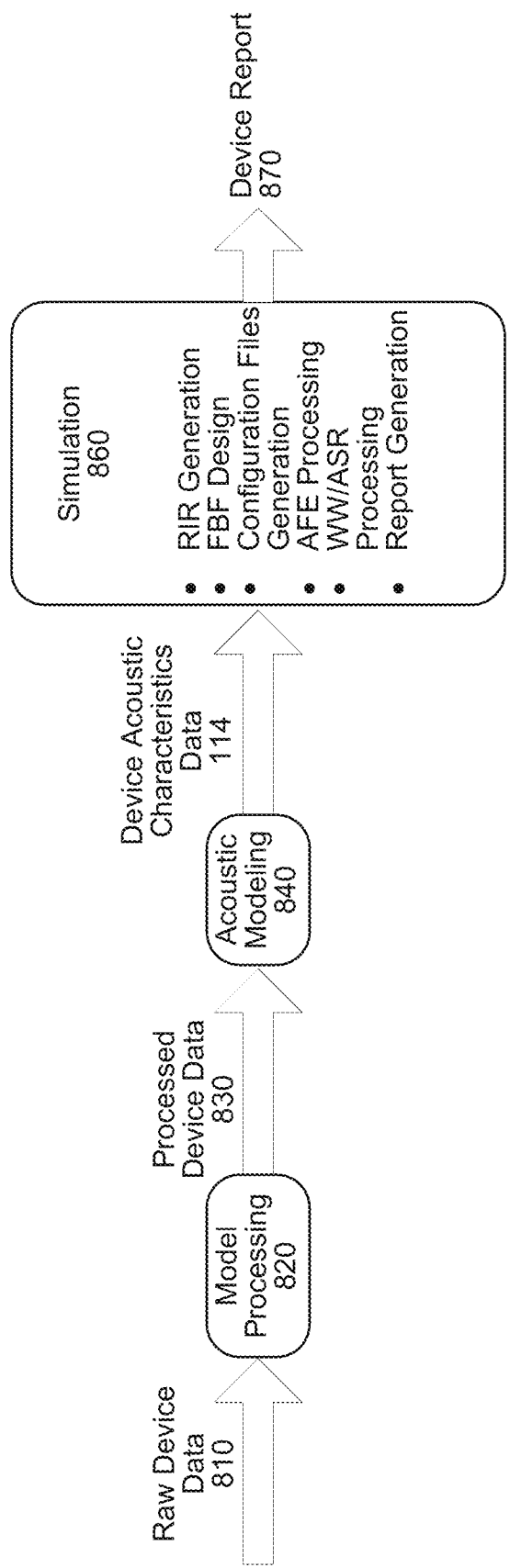
FIG. 8 illustrates an example of performing a simulation and generating a device report according to embodiments of the present disclosure.

FIG. 8 illustrates an example of performing a simulation and generating a device report according to embodiments of the present disclosure. As illustrated in FIG. 8, the system 100 may receive raw device data 810 and perform model processing 820 to generate processed device data 830. The system 100 may perform acoustic modeling 840 on the processed device data 830 to generate device acoustic characteristics data 114 (e.g., device dictionary) for the prototype device. For example, the system 100 may generate the device acoustic characteristics data 114 via simulation, as described in greater detail above with regard to FIG. 4B.

The system 100 may then perform a simulation 860 to generate a device report 870. For example, the system 100 may use the surface-augmented ray tracing (SART) method described in greater detail above with regard to FIG. 5 to generate the RIR data 116 and/or perform additional simulations using the RIR data 116. As illustrated in FIG. 8, the simulation 860 may correspond to room impulse response (RIR) generation, fixed beamformer (FBF) design, configuration files generation, audio front end (AFE) processing, wakeword (WW) and/or automatic speech recognition (ASR) processing, report generation, and/or the like.

In some examples, the simulation 860 may use the RIR data 116 to generate synthetic microphone audio data, as described in greater detail below with regard to FIGS. 9A-9C. For example, the system 100 may simulate the microphone array capturing an utterance and may generate the synthetic microphone audio data representing the utterance. Thus, the system 100 may analyze the synthetic microphone audio data to generate the device report 870, which may indicate performance parameters or other information about the microphone array. For example, the system 100 may perform speech processing on the synthetic microphone audio data to generate first text data and may compare the first text data to second text data (e.g., actual text represented by the utterance) to determine performance parameters such as false rejection rate (FRR), word error rate (WER), and/or the like. The disclosure is not limited thereto, however, and the simulation 860 may evaluate the synthetic microphone audio data and/or generate the device report 870 using a variety of techniques without departing from the disclosure.

Figure 9B:
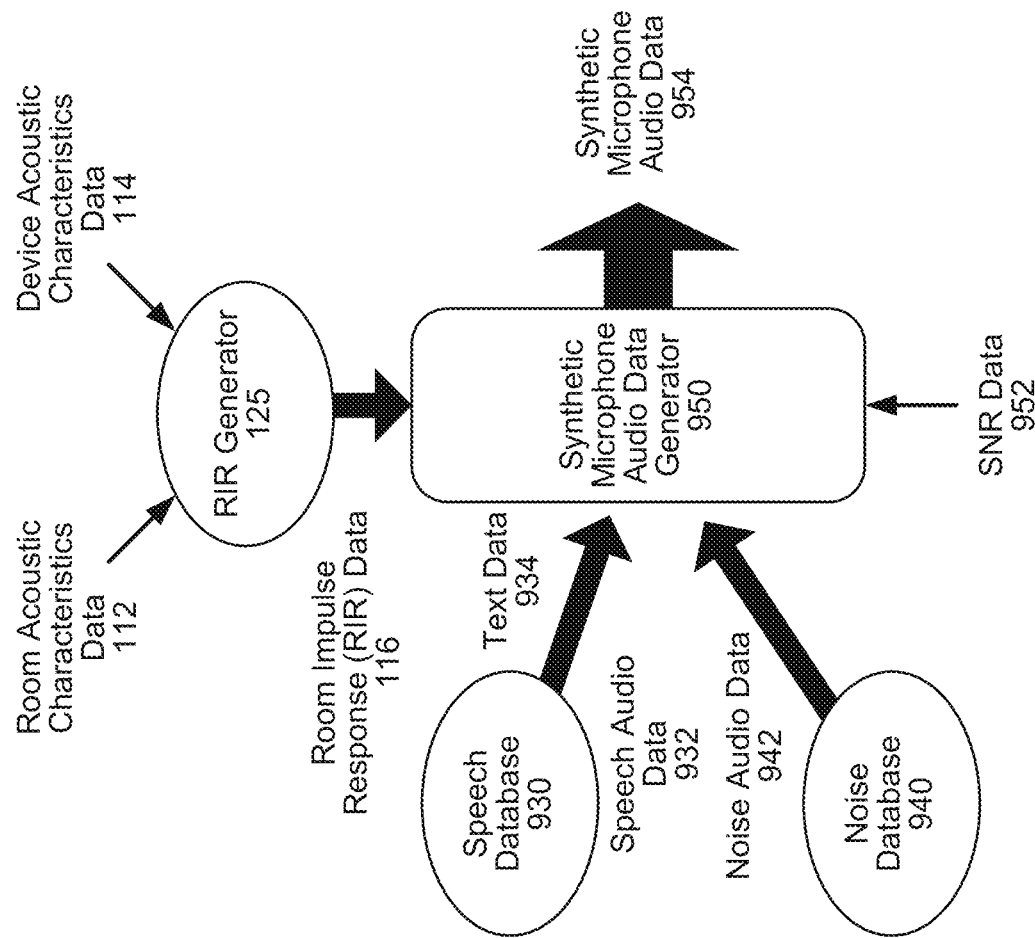
Figure 9C:
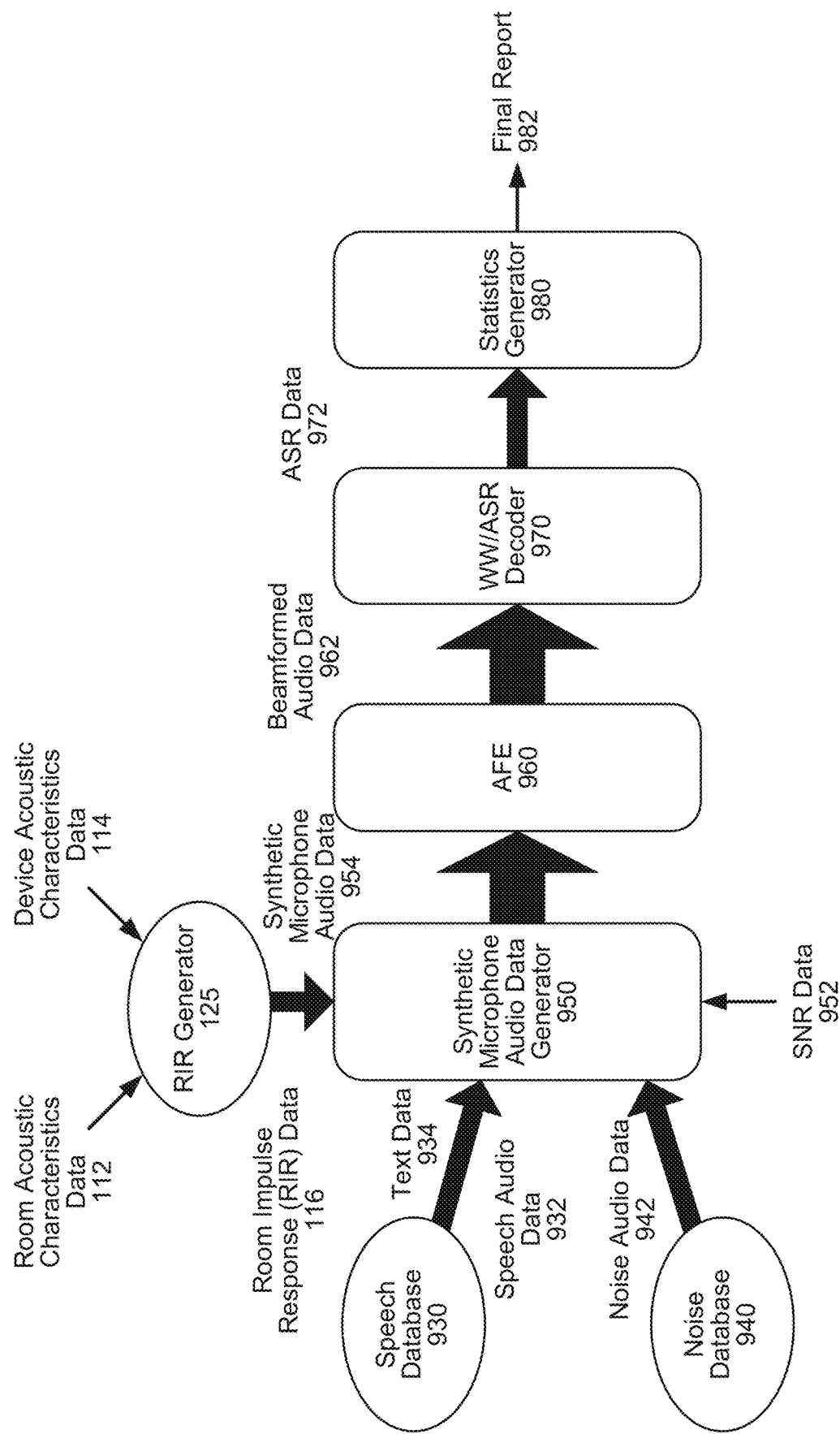

FIGS. 9A-9C illustrate examples of performing simulations of a microphone array according to embodiments of the present disclosure. As illustrated in FIG. 9A, a room impulse response (RIR) generator 125 may receive room acoustic characteristics data 112 and device acoustic characteristics data 114 and generate RIR data 116. For example, during simulation the system 100 may input the device acoustic characteristics data 114 corresponding to a potential microphone array, select a particular room to simulate, estimate and/or retrieve room acoustic characteristics data 112 associated with the room, and generate the RIR data 116. The room acoustic characteristics data 112 may be previously calculated, although the disclosure is not limited thereto and the system 100 may determine the room acoustic characteristics data 112 during the simulation using the techniques described above with regard to FIG. 5.

The RIR generator 125 may send the RIR data 116 to synthetic microphone audio data generator 950, which may generate synthetic microphone audio data 954. For example, the synthetic microphone audio data generator may receive speech audio data 932 from a speech database 930, along with text data 934 corresponding to the speech audio data 932, and may modify the speech audio data 932 based on the RIR data 116. Thus, in some examples the synthetic microphone audio data generator 950 may generate the synthetic microphone audio data 954 based only on the speech audio data 932. However, the disclosure is not limited thereto and in other examples the synthetic microphone audio data generator 950 may generate the synthetic microphone audio data 954 taking into account varying levels of noise without departing from the disclosure.

As illustrated in FIG. 9B, in some examples the synthetic microphone audio data generator 950 may receive noise audio data 942 from a noise database 940 and may modify the noise audio data 942 based on the RIR data 116. In addition, the synthetic microphone audio data generator 950 may receive signal-to-noise ratio (SNR) data 952 and may use the SNR data 952 to adjust the modified noise audio data based on the desired SNR (e.g., vary an amplitude of the noise audio data relative to an amplitude of the speech audio data).

In the example illustrated in FIG. 9B, the synthetic microphone audio data generator 950 may combine the modified speech audio data and the modified noise audio data to generate the synthetic microphone audio data 954. The system 100 may generate the synthetic microphone audio data 954 for any sort of data analysis, and is not limited to simulating the microphone array. For example, the system 100 may use the synthetic microphone audio data 954 for training and/or other purposes without departing from the disclosure.

The RIR generator 125 may generate the RIR data 116 using the techniques described above. Changing an angle of an acoustic wave is equivalent to rotating the simulated device associated with a microphone array in place. For example, rotating angles by 5 degrees is equivalent to rotating the simulated device by 5 degrees. Thus, using the room acoustic characteristics data 112 and the device acoustic characteristics data 114, the system 100 may generate an infinite number of combinations, which modifies the resulting synthetic microphone audio data 954. However, the room acoustic characteristics data 112 is specific to a certain configuration between a loudspeaker and the test microphone array, meaning that a first location of the loudspeaker and a second location of the test microphone array is fixed for the simulation.

While FIGS. 9A-9B illustrate simplified examples of generating the synthetic microphone audio data 954, the disclosure is not limited thereto. Instead, FIG. 9C illustrates a detailed example of processing the synthetic microphone audio data 954 to generate a final report 982 associated with the microphone array.

As illustrated in FIG. 9C, the synthetic microphone audio data generator 950 may output the synthetic microphone audio data 954 to an acoustic front end (AFE) 960. The AFE 960 may receive the synthetic microphone audio data 954 and perform audio processing, including beamforming, to generate beamformed audio data 962. In audio systems, beamforming refers to techniques that are used to isolate audio from a particular direction in a multi-directional audio capture system. Beamforming may be particularly useful when filtering out noise from non-desired directions. Beamforming may be used for various tasks, including isolating voice commands to be executed by a speech-processing system.

One technique for beamforming involves boosting audio received from a desired direction while dampening audio received from a non-desired direction. In one example of a beamformer system, a fixed beamformer unit employs a filter-and-sum structure to boost an audio signal that originates from the desired direction (sometimes referred to as the look-direction) while largely attenuating audio signals that original from other directions. A fixed beamformer unit may effectively eliminate certain diffuse noise (e.g., undesireable audio), which is detectable in similar energies from various directions, but may be less effective in eliminating noise emanating from a single source in a particular non-desired direction. The beamformer unit may also incorporate an adaptive beamformer unit/noise canceller that can adaptively cancel noise from different directions depending on audio conditions.

As discussed above, the system 100 may perform beamforming (e.g., perform a beamforming operation to generate beamformed audio data corresponding to individual directions). As used herein, beamforming (e.g., performing a beamforming operation) corresponds to generating a plurality of directional audio signals (e.g., beamformed audio data) corresponding to individual directions relative to the microphone array. For example, the beamforming operation may individually filter input audio signals generated by multiple microphones in the microphone array (e.g., first audio data associated with a first microphone, second audio data associated with a second microphone, etc.) in order to separate audio data associated with different directions. Thus, first beamformed audio data corresponds to audio data associated with a first direction, second beamformed audio data corresponds to audio data associated with a second direction, and so on. In some examples, the system 100 may generate the beamformed audio data by boosting an audio signal originating from the desired direction (e.g., look direction) while attenuating audio signals that originate from other directions, although the disclosure is not limited thereto.

These directional calculations may sometimes be referred to as "beams," with a first directional calculation (e.g., first filter coefficients) being referred to as a "first beam" corresponding to the first direction, the second directional calculation (e.g., second filter coefficients) being referred to as a "second beam" corresponding to the second direction, and so on. Thus, the system 100 stores hundreds of "beams" (e.g., directional calculations and associated filter coefficients) and uses the "beams" to perform a beamforming operation and generate a plurality of beamformed audio signals. However, "beams" may also refer to the output of the beamforming operation (e.g., plurality of beamformed audio signals). Thus, a first beam may correspond to first beamformed audio data associated with the first direction (e.g., portions of the input audio signals corresponding to the first direction), a second beam may correspond to second beamformed audio data associated with the second direction (e.g., portions of the input audio signals corresponding to the second direction), and so on. For ease of explanation, as used herein "beams" refer to the beamformed audio signals that are generated by the beamforming operation. Therefore, a first beam corresponds to first audio data associated with a first direction, whereas a first directional calculation corresponds to the first filter coefficients used to generate the first beam.

As illustrated in FIG. 9C, the AFE 960 may output the beamformed audio data 962 to a Wakeword (WW)/Automatic Speech Recognition (ASR) decoder 970. In some examples, the WW/ASR decoder 970 may analyze the beamformed audio data 962 to determine performance parameters associated with a wakeword engine. For example, a speech enabled device may include a wakeword engine that processes input audio data to detect a representation of a wakeword. When a wakeword is detected in the input audio data, the speech enabled device may generate input audio data corresponding to the wakeword and either perform speech processing on the input audio data or send the input audio data to a remote system for speech processing. Thus, the system 100 may evaluate the beamformed audio data 962 to determine performance parameters associated with the wakeword engine, such as a false rejection rate (FRR) or the like. The system 100 may use these performance parameters to improve the wakeword engine and/or to improve the microphone array. For example, the system 100 may modify the microphone array or select between multiple microphone arrays based on the performance parameters associated with the wakeword engine without departing from the disclosure.

Additionally or alternatively, the WW/ASR decoder 970 may evaluate the beamformed audio data 962 to determine performance parameters associated with ASR. Automatic speech recognition (ASR) is a field of computer science, artificial intelligence, and linguistics concerned with transforming audio data associated with speech into text data representative of that speech. Thus, the system 100 may perform ASR processing on the beamformed audio data 962 to generate ASR data 972, which may correspond to first text representing an utterance. The system 100 may compare the ASR data 972 to the text data 934 (e.g., actual text representing the utterance) to determine performance parameters associated with ASR, such as a word error rate (WER) and/or the like. The system 100 may use these performance parameters to improve the ASR and/or to improve the microphone array. For example, the system 100 may modify the microphone array or select between multiple microphone arrays based on the performance parameters associated with the ASR without departing from the disclosure.

The system 100 may generate these performance parameters using a statistics generator 980. For example, the statistics generator 980 may receive the beamformed audio data 962, the ASR data 972, and/or additional information (e.g., the text data 934, the synthetic microphone audio data 954, etc.) and may generate a final report 982 representing the performance parameters associated with the wakeword engine, the ASR, beamforming, and/or other components of the AFE 960. For example, the final report 982 may include performance parameters and/or other information associated with room impulse response (RIR) generation, fixed beamformer (FBF) design, configuration files generation, audio front end (AFE) processing, wakeword (WW) and/or automatic speech recognition (ASR) processing, report generation, and/or the like without departing from the disclosure.

While FIG. 9C illustrates an example implementation that includes the AFE 960, the WW/ASR decoder 970, and the statistics generator 980, the disclosure is not limited thereto and the system 100 may include additional components not illustrated in FIG. 9C and/or may remove some of the components without departing from the disclosure. For example, the synthetic microphone audio data generator 950 may directly send the synthetic microphone audio data 954 to the statistics generator 980 without departing from the disclosure.

Figure 10A:
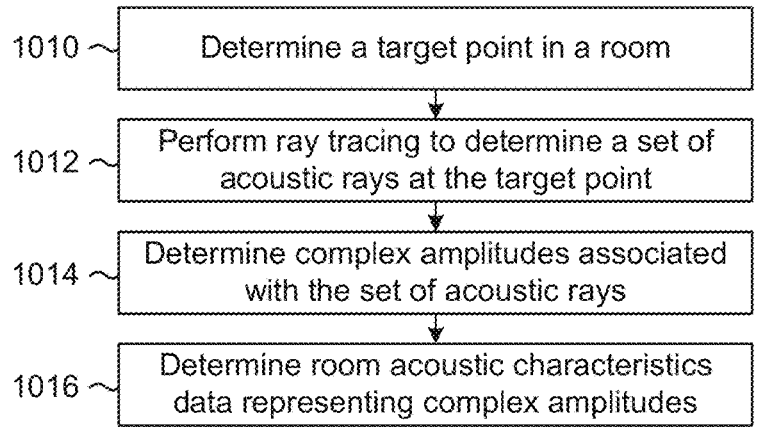
FIGS. 10A-10D are flowcharts conceptually illustrating example methods for generating estimated room impulse response data according to embodiments of the present disclosure.

FIGS. 10A-10D are flowcharts conceptually illustrating example methods for generating estimated room impulse response data according to embodiments of the present disclosure. In some examples, the system 100 may generate room acoustic characteristics data 112 as described in greater detail above with regard to FIG. 1. As illustrated in FIG. 10A, the system 100 may determine (1010) a target point (x,y,z) in a room (e.g., center of the device 110) and may perform (1012) ray tracing to determine data corresponding to a set of acoustic rays $\{r_1(\omega,\phi_1,\theta_1)\}$ at the target point. For example, the set of acoustic rays may approximate a plurality of acoustic plane waves that correspond to reflections generated by acoustically reflective surfaces of the room.

To illustrate an example, the system 100 may associate the target point with a first location in the room. The system 100 may simulate an audio source at a second location in the room and determine first acoustic rays originating at the second location and extending in a plurality of directions. Using the ray tracing method 120, the system 100 may determine second acoustic rays corresponding to reflections of the first acoustic rays caused by acoustically reflective surfaces in the room and select, from the first acoustic rays and the second acoustic rays, the plurality of acoustic rays received at and/or associated with the first location. As used herein, ray tracing may be a stochastic process, such that the second acoustic rays may be time varying due to the randomness (e.g., slight changes to the second acoustic rays occur over time, even when all parameters remain fixed).

To illustrate a specific example, the system 100 may determine a first acoustic ray originating at the second location and extending in a first direction and may determine that the first acoustic ray intersects an acoustically reflective surface at a third location. As used herein, the intersection between the first acoustic ray and the acoustically reflective surface refers to a point at which the first acoustic ray is reflected by the acoustically reflective surface. For ease of illustration, the disclosure may refer to this reflection as a separate acoustic ray, although the disclosure is not limited thereto. For example, the system 100 may determine a second acoustic ray originating at the third location and extending in a second direction (e.g., based on how the first acoustic ray is reflected by the acoustically reflective surface) and may determine that the second acoustic ray intersects the first location. However, the disclosure is not limited thereto, and instead of modeling an acoustic ray as extending infinitely in one direction, in some examples the system 100 may model an acoustic ray using all reflections. Thus, whenever an acoustic ray hits a wall, a reflection occurs, and the acoustic ray continues in a new direction. For example, the system 100 may model the first acoustic ray as including a first segment (e.g., from the second location to the third location) and a second segment (e.g., from the third location to the first location) without departing from the disclosure.

The system 100 may determine (1014) complex amplitudes associated with the set of acoustic rays and may determine (1016) room acoustic characteristics data 112 representing the complex amplitudes. For example, each ray $r_1$ is associated with a complex amplitude $a_1$, which can be represented as $a_1(\omega,\phi_1,\theta_1)$. As the complex amplitudes (e.g., intensity of an individual acoustic plane wave) are used to scale the device response to each plane wave, the room acoustic characteristics data 112 may represent the complex amplitudes as a string of values, a vector, and/or the like without departing from the disclosure.

As described above with regard to FIG. 1, the system 100 may measure or simulate scattering caused by a microphone array to generate device acoustic characteristics data 114 that is specific to the microphone array. For ease of illustration, the disclosure may refer to a microphone array as a "simulated microphone array," regardless of whether the microphone array is a physical microphone array or a "digital" microphone array included in a simulation. Thus, the simulated microphone array may correspond to a physical microphone array included in a physical device, such as the device 110 or a prototype or other device for which the system 100 will perform testing via simulation, or may correspond to a digital microphone array that has been designed or included in a digital model for a device but not yet created in physical form. The system 100 may determine the device acoustic characteristics data 114 for the microphone array either by physical measurement of the microphone array or by simulation using the digital model without departing from the disclosure.

Figure 10B:
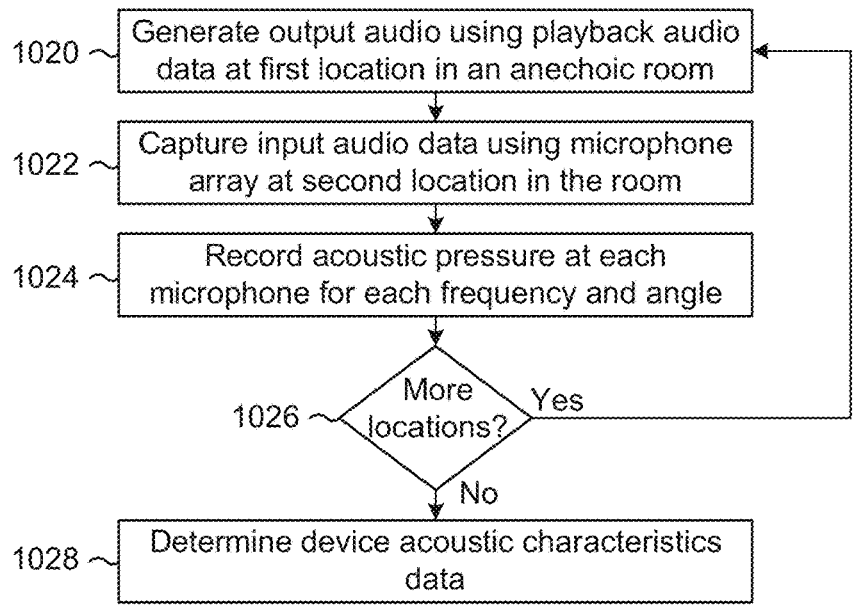

In some examples, the system 100 may generate the device acoustic characteristics data 114 using physical measurements of a microphone array included in a physical device, as described above with regard to FIG. 4C. As illustrated in FIG. 10B, the system 100 may generate (1020) output audio using playback audio data at a first location in an anechoic room, may capture (1022) input audio data using a microphone array at a second location in the room, and may record (1024) acoustic pressure at each microphone for each frequency and angle. The system 100 may determine (1026) whether there are more source locations to measure, and if so may loop to step 1020 and repeat steps 1020-1024 for an additional location. For example, the system 100 may measure acoustic pressure at each microphone of the device 410 using the audio source in all possible locations in the anechoic room, with the audio source running a frequency sweep across desired frequency bands of interest. If there are no more source locations to measure, the system 100 may determine (1028) device acoustic characteristics data 114 corresponding to the microphone array.

Figure 10C:
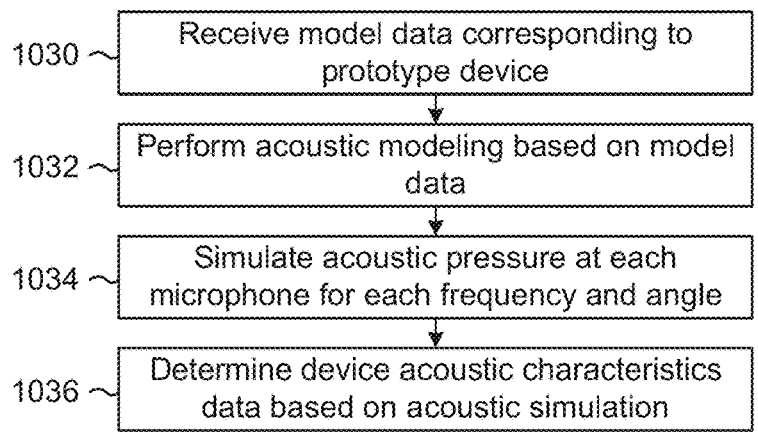

In other examples, the system 100 may generate device acoustic characteristics data for a microphone array using a simulation of the microphone array (e.g., using a model of a prototype device that includes the simulated microphone array), as described above with regard to FIG. 4B. As illustrated in FIG. 10C, the system 100 may receive (1030) model data corresponding to the prototype device, may perform (1032) acoustic modeling based on the model data, simulate (1034) acoustic pressure at each microphone for each frequency and angle, and determine (1036) device acoustic characteristics data 114 based on the acoustic simulation.

Figure 10D:
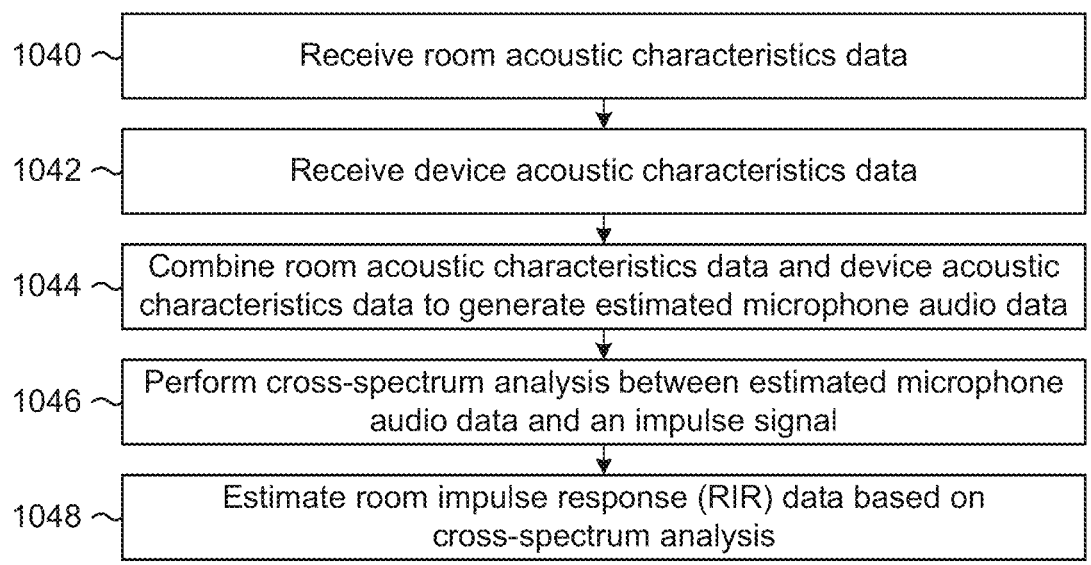

FIG. 10D illustrates an example of combining the room acoustic characteristics data 112 and the device acoustic characteristics data 114 to estimate room impulse response (RIR) data 116 for a room using the simulated microphone array. As illustrated in FIG. 10D, the system 100 may receive (1040) the room acoustic characteristics data 112 and may receive (1042) the device acoustic characteristics data 114. For example, the system 100 may determine the room acoustic characteristics data 112 using the method illustrated in FIG. 10A and/or may determine the device acoustic characteristics data 114 using one of the methods illustrated in FIGS. 10B-10C.

The system 100 may then combine (1044) the room acoustic characteristics data 112 and the device acoustic characteristics data 114 to generate estimated microphone audio data (e.g., synthetic microphone audio data or combined device and room characteristic data). For example, the system 100 may use Equation [4], described above with regard to FIG. 5, to determine an acoustic pressure at each of the microphones in the microphone array. The system 100 may perform (1046) cross-spectrum analysis between the estimated microphone audio data and an impulse signal used to generate the room acoustic characteristics data 112, and may estimate (1048) the room impulse response (RIR) data based on the cross-spectrum analysis. While FIG. 10D illustrates the system 100 performing a cross-spectrum analysis, the disclosure is not limited thereto and the system 100 may estimate the RIR data 116 using other techniques without departing from the disclosure. For example, the system 100 may perform cross-spectrum analysis in the frequency domain, cross-correlation analysis in the time domain, determine an inter-channel response, and/or the like without departing from the disclosure. Thus, step 1046 corresponds to determining a multi-channel system identification, system learning, or the like and is included to provide a non-limiting example of how the system 100 determines the RIR data 116.

Figure 11:
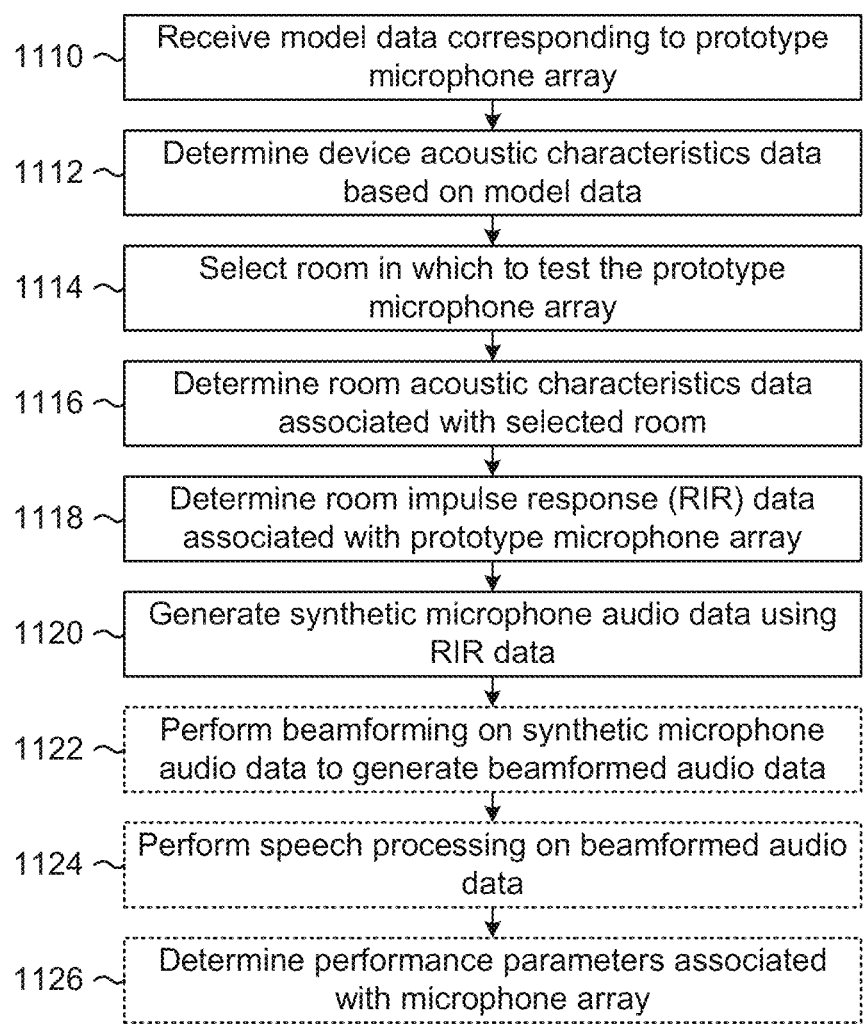
FIG. 11 is a flowchart conceptually illustrating an example method for performing a simulation and determining performance parameters according to embodiments of the present disclosure.

FIG. 11 is a flowchart conceptually illustrating an example method for performing a simulation and determining performance parameters according to embodiments of the present disclosure. As illustrated in FIG. 11, the system 100 may receive (1110) model data corresponding to a prototype microphone array (e.g., microphone array to simulate) and may determine (1112) device acoustic characteristics data based on the model data. The system 100 may select (1114) a room in which to test the prototype microphone array and determine (1116) room acoustic characteristics data associated with the selected room. The system 100 may determine (1118) room impulse response (RIR) data associated with the prototype microphone array and may generate (1120) synthetic microphone audio data using the RIR data.

In some examples, the system 100 may perform (1122) beamforming on the synthetic microphone audio data to generate beamformed audio data, perform (1124) speech processing on the beamformed audio data, and determine (1126) performance parameters associated with the microphone array, as described in greater detail above with regard to FIG. 9A. However, as this is optional, steps 1122-1126 are illustrated in FIG. 11 using dashed lines to indicate that these steps are not required. Instead, the synthetic microphone audio data may be used for any data analysis and/or training without determining performance parameters of the microphone array.

Figure 12A:
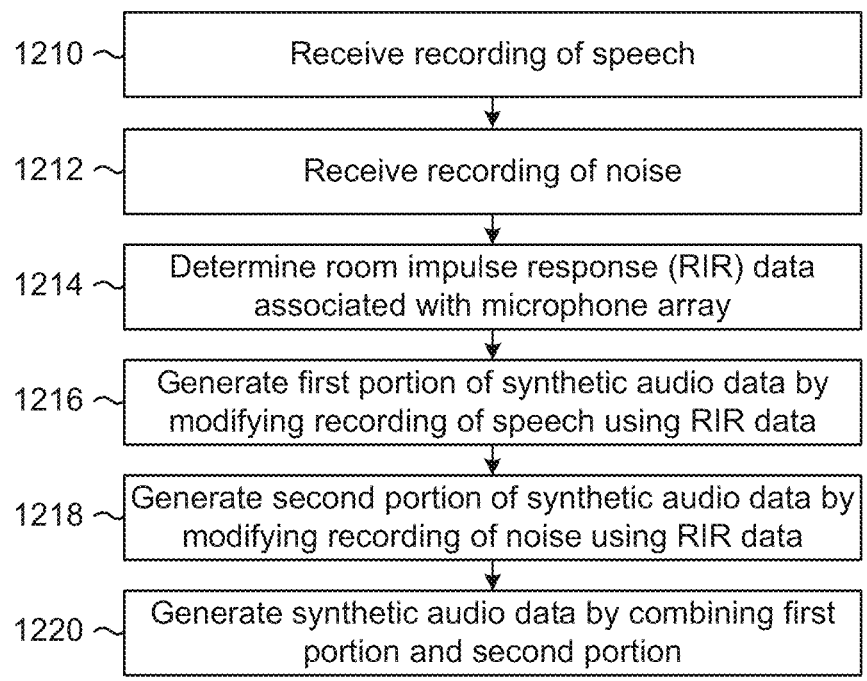
FIGS. 12A-12B are flowcharts conceptually illustrating example methods for generating synthetic microphone audio data and determining performance parameters according to embodiments of the present disclosure.
Figure 12B:
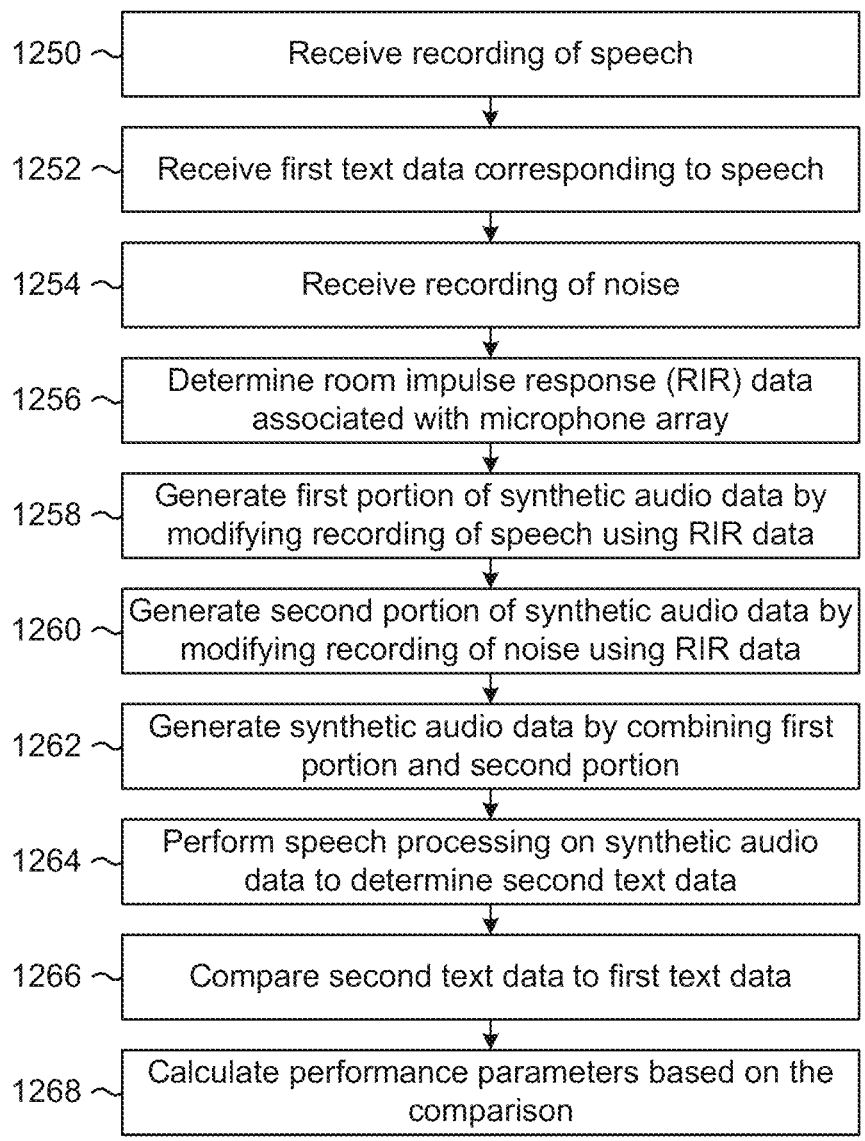

FIGS. 12A-12B are flowcharts conceptually illustrating example methods for generating synthetic microphone audio data and determining performance parameters according to embodiments of the present disclosure. As illustrated in FIG. 12A, the system 100 may receive (1210) a recording of speech and may optionally receive (1212) a recording of noise. In some examples, the system 100 may generate the synthetic microphone audio data using the noise, but the disclosure is not limited thereto.

The system 100 may determine (1214) room impulse response (RIR) data associated with a microphone array and generate (1216) a first portion of synthetic audio data by modifying the recording of speech using the RIR data. For example, the system 100 may convolve the recording of speech and the RIR data to simulate the microphone array capturing the recording of speech. In addition, the system 100 may generate (1218) a second portion of the synthetic audio data by modifying the recording of noise using the RIR data. For example, the system 100 may convolve the recording of noise and the MR data to simulate the microphone array capturing the recording of noise. The system 100 may then generate (1220) the synthetic audio data by combining the first portion and the second portion. For example, the system 100 may combine the first portion and the second portion based on a desired signal-to-noise ratio (SNR) value or the like. While not illustrated in FIG. 12A, the system 100 may perform other analysis using the synthetic audio data, as described in greater detail above.

As illustrated in FIG. 12B, the system 100 may receive (1250) a recording of speech, receive (1252) first text data corresponding to the speech, and receive (1254) a recording of noise. The system 100 may determine (1256) room impulse response (RIR) data associated with a microphone array and generate (1258) a first portion of synthetic audio data by modifying the recording of speech using the RIR data. For example, the system 100 may convolve the recording of speech and the RIR data to simulate the microphone array capturing the recording of speech. In addition, the system 100 may generate (1260) a second portion of the synthetic audio data by modifying the recording of noise using the RIR data. For example, the system 100 may convolve the recording of noise and the RIR data to simulate the microphone array capturing the recording of noise. The system 100 may then generate (1262) the synthetic audio data by combining the first portion and the second portion. For example, the system 100 may combine the first portion and the second portion based on a desired signal-to-noise ratio (SNR) value or the like.

The system 100 may then perform (1264) speech processing on the synthetic audio data to determine second text data, may compare (1266) the second text data to the first text data, and may calculate (1268) performance parameters based on the comparison. While not illustrated in FIG. 12B, the system 100 may perform other analysis using the synthetic audio data, as described in greater detail above.

Figure 13:
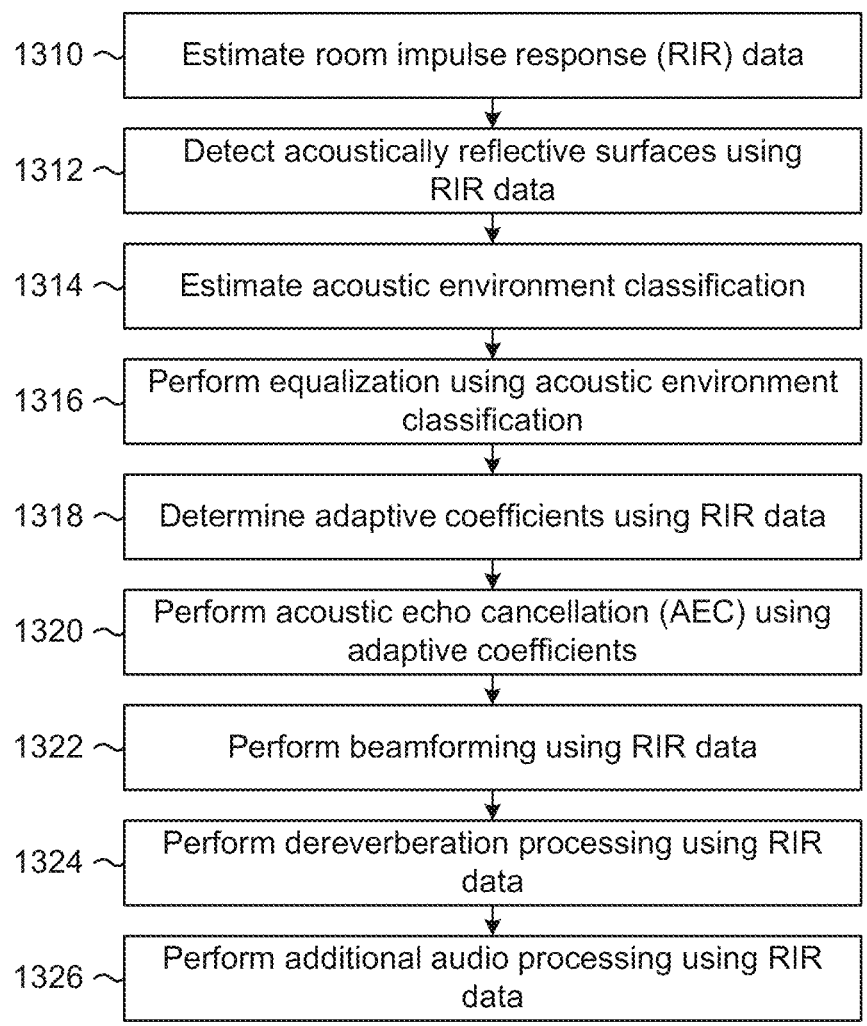
FIG. 13 is a flowchart conceptually illustrating an example method for performing additional processing using the room impulse response data according to embodiments of the present disclosure.

FIG. 13 is a flowchart conceptually illustrating an example method for performing additional processing using the room impulse response data according to embodiments of the present disclosure. As illustrated in FIG. 13, the device 110 may estimate (1310) room impulse response (RIR) data, as described in greater detail above with regard to FIG. 5. For example, the device 110 may use a surface-augmented ray tracing method that combines the ray tracing method and device acoustic characteristics data to generate the RIR data 116.

In some examples, the device 110 may detect (1312) acoustically reflective surfaces using the RIR data 116, may estimate (1314) an acoustic environment classification corresponding to a position of the device relative to the acoustically reflective surfaces, and may perform (1316) equalization using the acoustic environment classification, as described in greater detail above with regard to FIG. 6. For example, the device 110 may determine whether the device is positioned in a corner of a room, along a single wall, or in a center of the room away from any acoustically reflective surfaces. Based on the position of the device in the room, the device 110 may modify the equalization settings that are applied to generate output audio data. Thus, the device 110 may improve a listener experience for a user.

In some examples, the device 110 may determine (1318) adaptive coefficients using the RIR data 116 and may perform (1320) acoustic echo cancellation (AEC) using the adaptive coefficients, as described in greater detail above with regard to FIG. 6. For example, the device 110 may use the RIR data 116 to estimate a transfer function associated with loudspeaker(s) and generate an echo estimate signal representing a portion of output audio that is recaptured by the microphone array. The device 110 may perform AEC processing by subtracting the echo estimate signal from input audio data generated by the microphone array to generate isolated audio data.

In some examples, the device 110 may perform (1322) acoustic beamforming using the RIR data 116, as described in greater detail above with regard to FIG. 6. For example, the device 110 may use the RIR data 116 to track changes in the room impulse response over time, to estimate a speaking user's likely location within the environment, and/or the like.

In some examples, the device 110 may perform (1324) dereverberation processing using the RIR data 116 and may perform (1326) additional audio processing using the RIR data 116 without departing from the disclosure.

While FIG. 13 illustrates examples of audio processing that the device 110 may perform using the RIR data 116, these examples are intended to conceptually illustrate a potential implementation and the disclosure is not limited thereto. For example, the device 110 may only perform a portion of the audio processing illustrated in FIG. 13 without departing from the disclosure.

Figure 14:
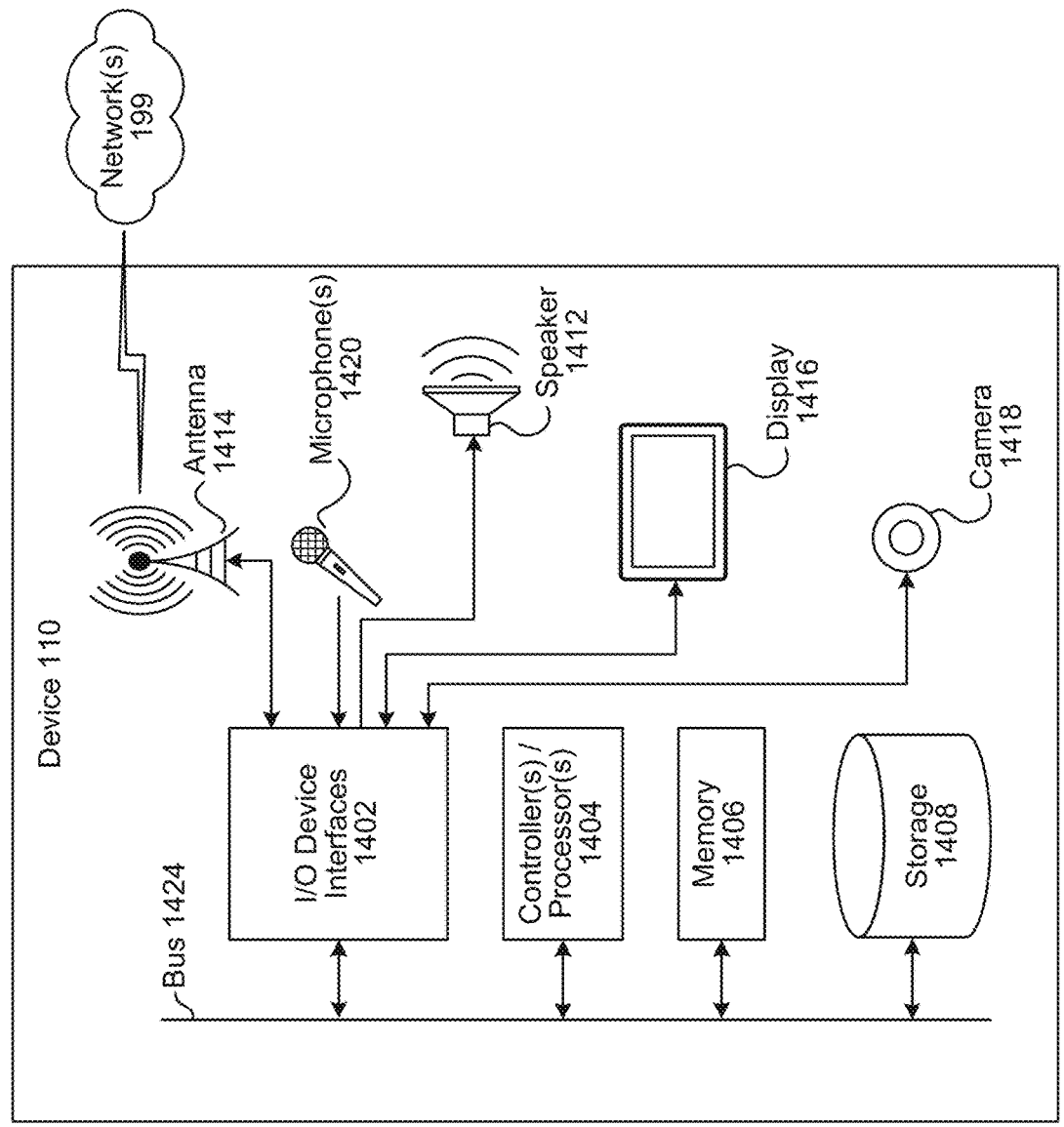
FIG. 14 is a block diagram conceptually illustrating example components of a device according to embodiments of the present disclosure.

FIG. 14 is a block diagram conceptually illustrating a device 110 that may be used with the system according to embodiments of the present disclosure. FIG. 15 is a block diagram conceptually illustrating example components of a simulation device according to embodiments of the present disclosure. The simulation device 102 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The simulation device 102 may be configured to operate using one or more of a client-server model, a computer bureau model, grid computing techniques, fog computing techniques, mainframe techniques, utility computing techniques, a peer-to-peer model, sandbox techniques, or other computing techniques.

Each of these devices (110/102) may include one or more controllers/processors (1404/1504), which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (110/102) may also include a data storage component (1408/1508) for storing data and controller/processor-executable instructions. Each data storage component (1408/1508) may individually include one or more non-volatile storage types such as magnetic storage, optical storage, solid-state storage, etc. Each device (110/102) may also be connected to removable or external non-volatile memory and/or storage (such as a removable memory card, memory key drive, networked storage, etc.) through respective input/output device interfaces (1402/1502).

Computer instructions for operating each device (110/102) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (110/102) includes input/output device interfaces (1402/1502). A variety of components may be connected through the input/output device interfaces (1402/1502), as will be discussed further below. Additionally, each device (110/102) may include an address/data bus (1424/1524) for conveying data among components of the respective device. Each component within a device (110/102) may also be directly connected to other components in addition to (or instead of) being connected to other components across the bus (1424/1524).

Referring to FIG. 14, the device 110 may include input/output device interfaces 1402 that connect to a variety of components such as an audio output component such as a speaker 1412, a wired headset or a wireless headset (not illustrated), or other component capable of outputting audio. The device 110 may also include an audio capture component. The audio capture component may be, for example, microphone(s) 1420 (e.g., array of microphones). If an array of microphones is included, approximate distance to a sound's point of origin may be determined by acoustic localization based on time and amplitude differences between sounds captured by different microphones of the array. In some examples, the device 110 may additionally include a display 1415 for displaying content and/or a camera 1418, although the disclosure is not limited thereto.

Via antenna(s) 1414, the input/output device interfaces 1402 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1402/1502) may also include communication components that allow data to be exchanged between devices such as different physical servers in a collection of servers or other components.

The components of the device (110/102) may include their own dedicated processors, memory, and/or storage. Alternatively, one or more of the components of the device (110/102) may utilize the I/O interfaces (1402/1502), processor(s) (1404/1504), memory (1406/1506), and/or storage (1408/1508) of the device (110/102), respectively.

As noted above, multiple devices may be employed in a single system. In such a multi-device system, each of the devices may include different components for performing different aspects of the system's processing. The multiple devices may include overlapping components. The components of the device (110/102), as described herein, are illustrative, and may be located as a stand-alone device or may be included, in whole or in part, as a component of a larger device or system.

Multiple device (110/102) and/or other components may be connected over a network(s) 199. The network(s) 199 may include a local or private network or may include a wide network such as the Internet. Devices may be connected to the network(s) 199 through either wired or wireless connections. For example, the devices 110 may be connected to the network(s) 199 through a wireless service provider, over a WiFi or cellular network connection, or the like. Other devices are included as network-connected support devices, such as the simulation device 102 and/or other components. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
retrieving device acoustic characteristics data representing a frequency response of a microphone array of a device, the microphone array including a first microphone and a second microphone;

simulating a loudspeaker at a first position in a room;

performing ray tracing to estimate ray data indicating a plurality of acoustic rays received at the device, the device being located at a second position in the room and wherein the plurality of acoustic rays are generated by the loudspeaker in response to an impulse signal, the plurality of acoustic rays including a first acoustic ray reflected by an acoustically reflective surface of the room;

determining first complex amplitude data for the first acoustic ray;

determining, using the device acoustic characteristics data, first acoustic pressure vector data corresponding to the first acoustic ray, the first acoustic pressure vector data including a first value for the first microphone and a second value for the second microphone;

determining, using the first complex amplitude data and the first acoustic pressure vector data, a third value representing a first acoustic pressure within a first frequency range, the first acoustic pressure associated with the first acoustic ray;

determining a fourth value representing a second acoustic pressure within the first frequency range, the second acoustic pressure associated with a second acoustic ray of the plurality of acoustic rays;

determining, using the ray data corresponding to the plurality of acoustic rays and the device acoustic characteristics data, estimated microphone audio data simulating the microphone array capturing the impulse signal; and generating, using the estimated microphone audio data and the impulse signal, estimated room impulse response data representing a combination of room acoustics and device acoustics.

2. A computer-implemented method, the method comprising:

receiving first acoustic characteristics data representing a first frequency response associated with a microphone array of a device;

performing ray-based acoustic modeling to determine data representing a plurality of acoustic rays associated with a first location of the device in an environment;

determining, using the data representing the plurality of acoustic rays and the first acoustic characteristics data, first audio data representing acoustic pressure values corresponding to the plurality of acoustic rays and scattering corresponding to a surface of the device; and generating impulse response data using the first audio data.

3. The computer-implemented method of claim 2, further comprising:

determining a first complex amplitude for a first acoustic ray of the plurality of acoustic rays;

determining, using the first acoustic characteristics data, a first acoustic pressure vector corresponding to the first acoustic ray, the first acoustic pressure vector including a first value associated with a first microphone of the microphone array and a second value associated with a second microphone of the microphone array;

determining, using the first complex amplitude and the first value, a third value representing a first acoustic pressure associated with the first microphone and the first acoustic ray; and determining, using the first complex amplitude and the second value, a fourth value representing a second acoustic pressure associated with the second microphone and the first acoustic ray.

4. The computer-implemented method of claim 2, wherein performing the ray-based acoustic modeling further comprises:

simulating an audio source at a second location in the environment;

determining first acoustic rays originating at the second location, the first acoustic rays corresponding to a plurality of directions;

determining second acoustic rays corresponding to reflections of the first acoustic rays caused by acoustically reflective surfaces in the environment; and selecting, from the first acoustic rays and the second acoustic rays, the plurality of acoustic rays associated with the first location.

5. The computer-implemented method of claim 2, wherein performing the ray-based acoustic modeling further comprises:

simulating an audio source at a second location in the environment;

determining a first acoustic ray originating at the second location and extending in a first direction;

determining that the first acoustic ray intersects an acoustically reflective surface at a third location;

determining a second acoustic ray originating at the third location and extending in a second direction;

determining that the second acoustic ray intersects the first location; and determining the plurality of acoustic rays associated with the first location, including the second acoustic ray.

6. The computer-implemented method of claim 2, further comprising:

generating a digital model for the device; and performing acoustic modeling to determine the first acoustic characteristics data associated with the microphone array, the first acoustic characteristics data representing a plurality of vectors, a first vector of the plurality of vectors corresponding to a first acoustic wave of a plurality of acoustic waves.

7. The computer-implemented method of claim 2, wherein the first acoustic characteristics data represents at least a first anechoic response of the microphone array to an acoustic plane wave and a second anechoic response of the microphone array to a spherical acoustic wave.

8. The computer-implemented method of claim 2, further comprising:

determining second audio data corresponding to an impulse signal;

determining cross-spectrum analysis data corresponding to a cross-spectrum analysis between the first audio data and the second audio data; and using the cross-spectrum analysis data to generate the impulse response data.

9. The computer-implemented method of claim 2, further comprising:

receiving second audio data including a first representation of speech;

receiving first text data representing text corresponding to the first representation of the speech;

generating, using the second audio data and the impulse response data, a first portion of output audio data, the output audio data including a second representation of the speech as though captured by the microphone array;
receiving third audio data representing acoustic noise;
generating, using the third audio data and the impulse response data, a second portion of the output audio data;
generating the output audio data by combining the first portion and the second portion;
performing speech processing on the output audio data to determine second text data; and
determining, using the first text data and the second text data, a performance parameter associated with the microphone array.

10. The computer-implemented method of claim 2, further comprising:
using the impulse response data to detect at least one acoustically reflective surface in the environment;
determining an acoustic environment classification indicating a position of the device relative to the at least one acoustically reflective surface;
using the acoustic environment classification to select equalization settings;
using the equalization settings to generate output audio data; and
generating output audio using the output audio data.

11. The computer-implemented method of claim 2, wherein the first acoustic characteristics data includes at least one vector representing a plurality of values, a first number of the plurality of values corresponding to a second number of microphones in a second microphone array, a first value of the plurality of values corresponding to a first microphone of the second microphone array and representing an acoustic pressure at the first microphone in response to an acoustic wave.

12. A system comprising:
at least one processor; and
memory including instructions operable to be executed by the at least one processor to cause the system to:
receive first acoustic characteristics data representing a first frequency response associated with a microphone array of a device;
perform ray-based acoustic modeling to determine data representing a plurality of acoustic rays associated with a first location of the device in an environment;
determine, using the data representing the plurality of acoustic rays and the first acoustic characteristics data, first audio data representing acoustic pressure values corresponding to the plurality of acoustic rays and scattering corresponding to a surface of the device; and
generate impulse response data using the first audio data.

13. The system of claim 12, wherein the memory further comprises instructions that, when executed by the at least one processor, further cause the system to:
determine a first complex amplitude for a first acoustic ray of the plurality of acoustic rays;
determine, using the first acoustic characteristics data, a first acoustic pressure vector corresponding to the first acoustic ray, the first acoustic pressure vector including a first value associated with a first microphone of the microphone array and a second value associated with a second microphone of the microphone array;
determine, using the first complex amplitude and the first value, a third value representing a first acoustic pressure associated with the first microphone and the first acoustic ray; and
determine, using the first complex amplitude and the second value, a fourth value representing a second acoustic pressure associated with the second microphone and the first acoustic ray.

14. The system of claim 12, wherein the memory further comprises instructions that, when executed by the at least one processor, further cause the system to:
simulate an audio source at a second location in the environment;
determine first acoustic rays originating at the second location, the first acoustic rays corresponding to a plurality of directions;
determine second acoustic rays corresponding to reflections of the first acoustic rays caused by acoustically reflective surfaces in the environment; and
select, from the first acoustic rays and the second acoustic rays, the plurality of acoustic rays associated with the first location.

15. The system of claim 12, wherein the memory further comprises instructions that, when executed by the at least one processor, further cause the system to:
simulate an audio source at a second location in the environment;
determine a first acoustic ray originating at the second location and extending in a first direction;
determine that the first acoustic ray intersects an acoustically reflective surface at a third location;
determine a second acoustic ray originating at the third location and extending in a second direction;
determine that the second acoustic ray intersects the first location; and
determine the plurality of acoustic rays associated with the first location, including the second acoustic ray.

16. The system of claim 12, wherein the memory further comprises instructions that, when executed by the at least one processor, further cause the system to:
generate a digital model for the device; and
perform acoustic modeling to determine the first acoustic characteristics data associated with the microphone array, the first acoustic characteristics data representing a plurality of vectors, a first vector of the plurality of vectors corresponding to a first acoustic wave of a plurality of acoustic waves.

17. The system of claim 12, wherein the first acoustic characteristics data represents at least a first anechoic response of the microphone array to an acoustic plane wave and a second anechoic response of the microphone array to a spherical acoustic wave.

18. The system of claim 12, wherein the memory further comprises instructions that, when executed by the at least one processor, further cause the system to:
determine second audio data corresponding to an impulse signal;
determine cross-spectrum analysis data corresponding to a cross-spectrum analysis between the first audio data and the second audio data; and
use the cross-spectrum analysis data to generate the impulse response data.

19. The system of claim 13, wherein the memory further comprises instructions that, when executed by the at least one processor, further cause the system to:
receive second audio data including a first representation of speech;
receive first text data representing text corresponding to the first representation of the speech;
generate, using the second audio data and the impulse response data, a first portion of output audio data, the output audio data including a second representation of the speech as though captured by the microphone array;

receive third audio data representing acoustic noise;

generate, using the third audio data and the impulse response data, a second portion of the output audio data;

generate the output audio data by combining the first portion and the second portion;

perform speech processing on the output audio data to determine second text data; and determine, using the first text data and the second text data, a performance parameter associated with the microphone array.

20. The system of claim 12, wherein the memory further comprises instructions that, when executed by the at least one processor, further cause the system to:

use the impulse response data to detect at least one acoustically reflective surface in the environment;

determine an acoustic environment classification indicating a position of the device relative to the at least one acoustically reflective surface;

use the acoustic environment classification to select equalization settings;

use the equalization settings to generate output audio data; and generate output audio using the output audio data.

* * * * *